United States Patent
Lin

(10) Patent No.: US 10,024,551 B2
(45) Date of Patent: Jul. 17, 2018

(54) INSULATING GLASS STYLE SOLAR HEAT COLLECTOR AND BUILDING USING SOLAR ENERGY FOR HEATING AND COOLING

(71) Applicants: Huazi Lin, Richmond Hill (CA); W&E International (Canada) Corp., Richmond Hill (CA)

(72) Inventor: Huazi Lin, Richmond Hill (CA)

(73) Assignees: Huazi Lin, Richmond Hill (CA); W&E INTERNATIONAL (CANADA) CORP., Richmond Hill (CA)

( * ) Notice: Subject to any disclaimer, the term of this patent is extended or adjusted under 35 U.S.C. 154(b) by 654 days.

(21) Appl. No.: 14/578,930

(22) Filed: Dec. 22, 2014

(65) Prior Publication Data

US 2015/0107581 A1 Apr. 23, 2015

Related U.S. Application Data

(63) Continuation of application No. PCT/CA2013/000856, filed on Jun. 27, 2013.

(30) Foreign Application Priority Data

Jun. 27, 2012 (CA) .................... 2781743

(51) Int. Cl.
  *E04D 13/18* (2018.01)
  *F24D 5/00* (2006.01)
  *F24J 2/34* (2006.01)
  *F24J 2/04* (2006.01)
  *F24J 2/24* (2006.01)
  (Continued)

(52) U.S. Cl.
  CPC .............. *F24D 5/005* (2013.01); *E04H 4/129* (2013.01); *F24D 11/007* (2013.01); *F24H 1/182* (2013.01); *F24J 2/045* (2013.01); *F24J 2/0444* (2013.01); *F24J 2/0461* (2013.01); *F24J 2/05* (2013.01); *F24J 2/24* (2013.01); *F24J 2/34* (2013.01); *F24J 2/345* (2013.01); *F24D 2200/14* (2013.01); *F24D 2220/006* (2013.01); *F24D 2220/02* (2013.01); *F24F 2005/0064* (2013.01); *F24J 2002/0411* (2013.01); *Y02A 30/272* (2018.01); *Y02A 30/62* (2018.01);
  (Continued)

(58) Field of Classification Search
  CPC ......... F24D 5/005; F24D 11/007; F24J 2/045; F24J 2/0477
  See application file for complete search history.

(56) References Cited

U.S. PATENT DOCUMENTS 4,051,999 A * 10/1977 Granger ................ F24D 11/007
  126/400
4,159,708 A * 7/1979 Pyle ....................... F24J 2/0477
  126/645

* cited by examiner

*Primary Examiner* — Jason Lau
(74) *Attorney, Agent, or Firm* — WPAT, PC

(57) ABSTRACT

A building using solar energy for heating and cooling is disclosed. The building comprises a fluid channel arranged for a fluid to transfer absorbed solar heat, a solar heat storage bank to store and supply the solar heat, and a mechanism for directing and controlling the flow of the fluid throughout the building. A insulating glass style solar heat collector (IG-SHC) as a building element comprises a insulating glass means; a replaceable solar heat absorber removably received in a slot in the hollow space of the insulating glass, and separates the space into two subspaces; a fluid channel is thermally connected to the solar heat absorber for heat transferring; and a mechanism for directing and controlling the flow of said fluid.

31 Claims, 9 Drawing Sheets

(51) Int. Cl.
  *E04H 4/12* (2006.01)
  *F24H 1/18* (2006.01)
  *F24D 11/00* (2006.01)
  *F24J 2/05* (2006.01)
  *F24F 5/00* (2006.01)
(52) U.S. Cl.
  CPC .............. *Y02B 10/20* (2013.01); *Y02B 10/24* (2013.01); *Y02E 10/44* (2013.01)

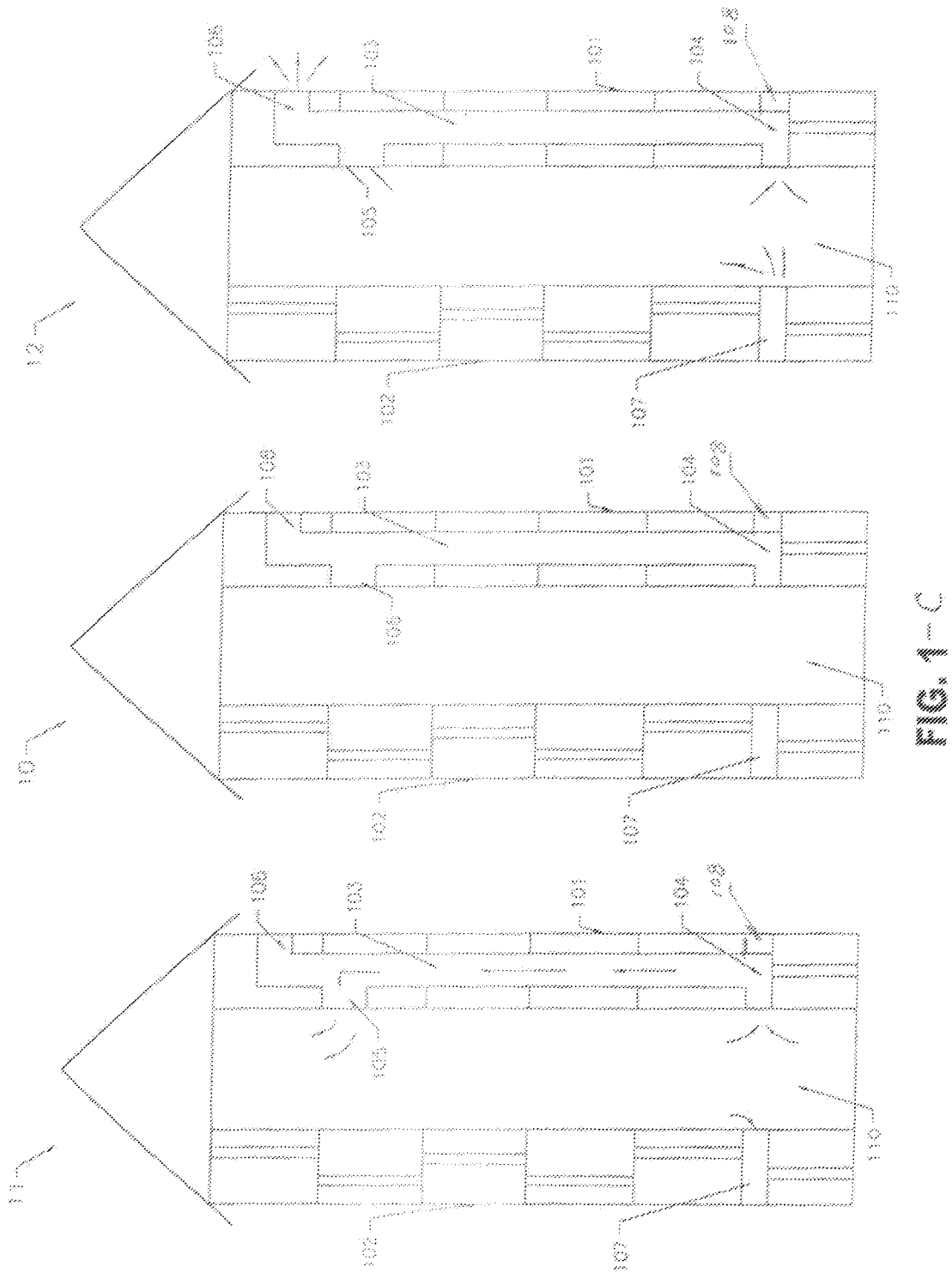

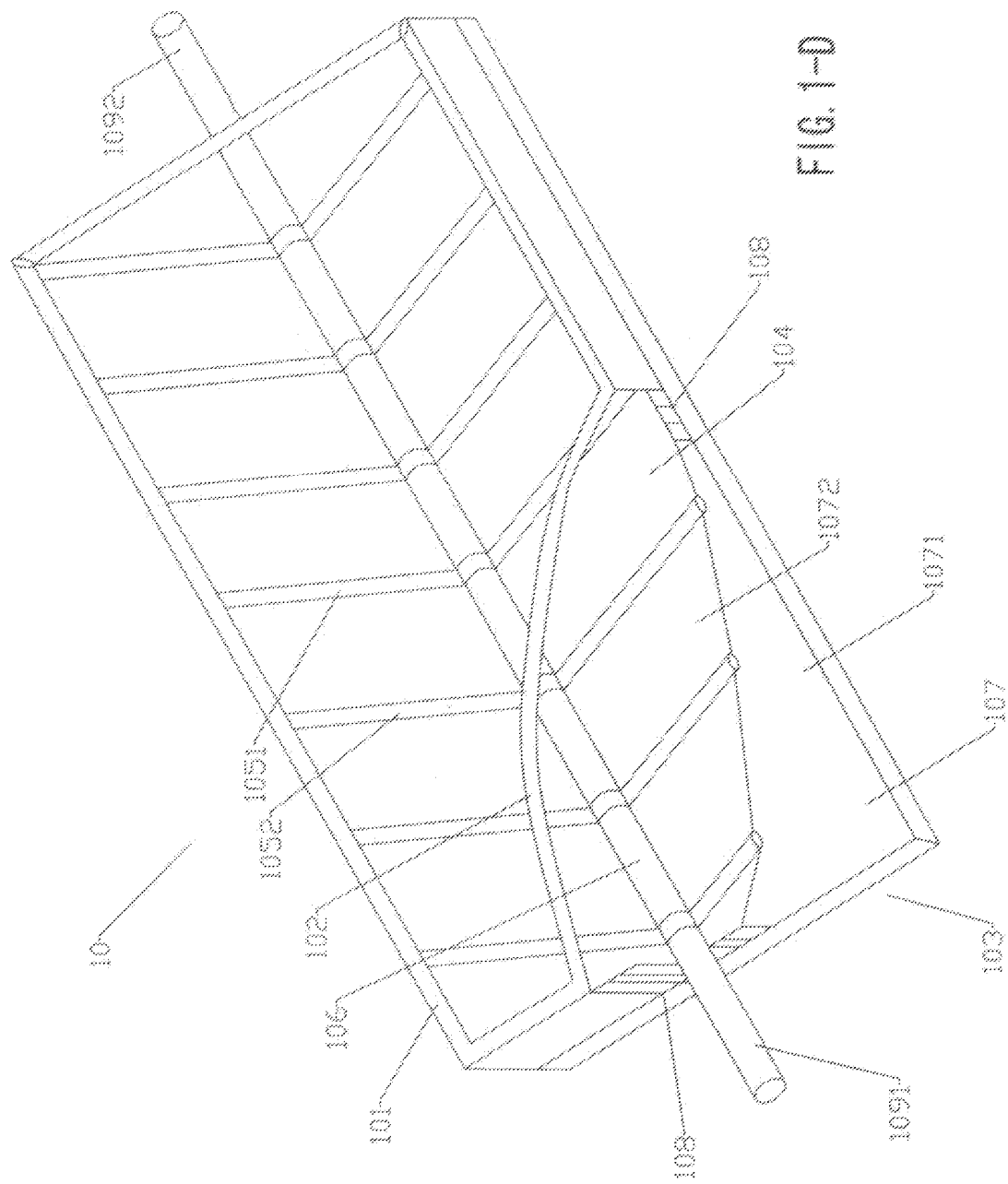

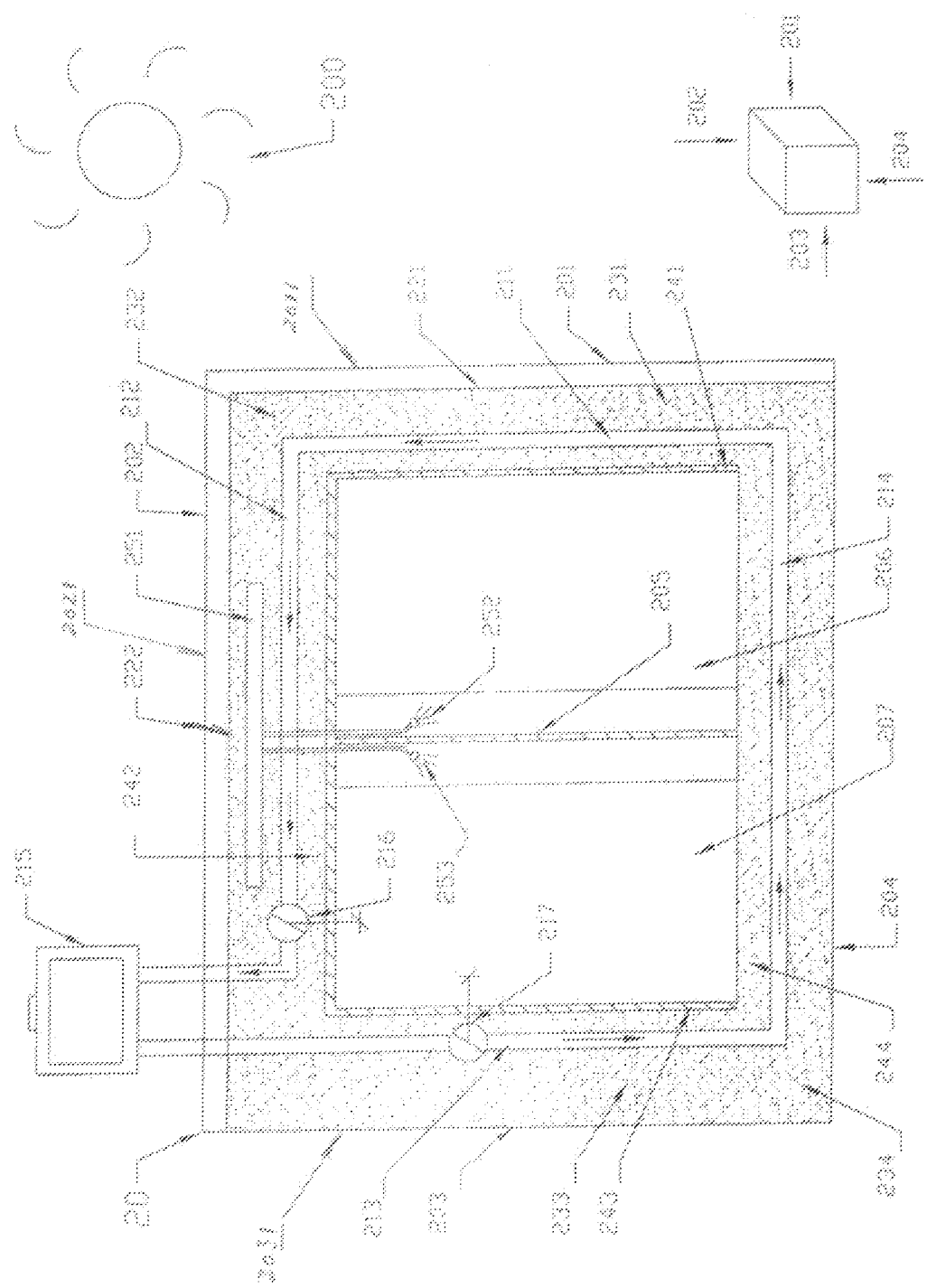
FIG. 2-C

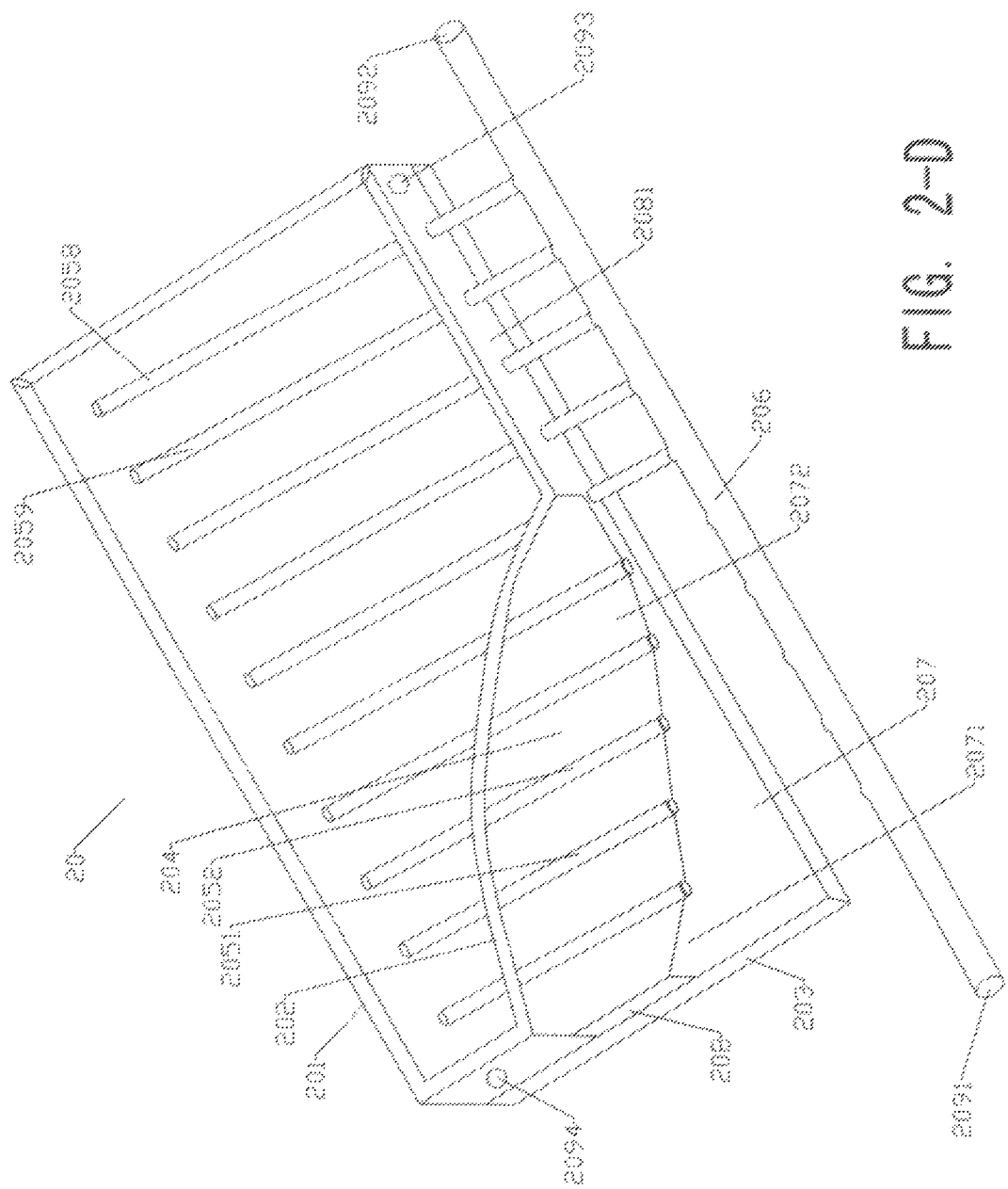

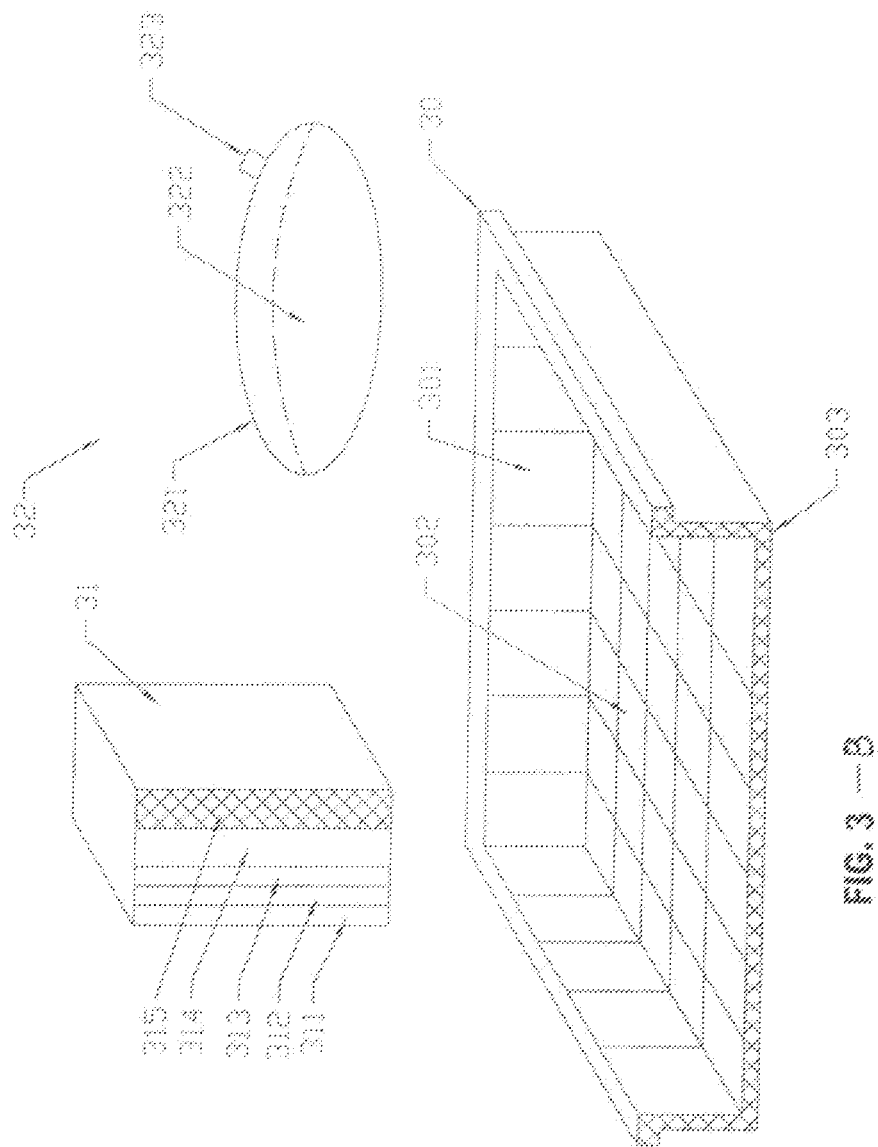

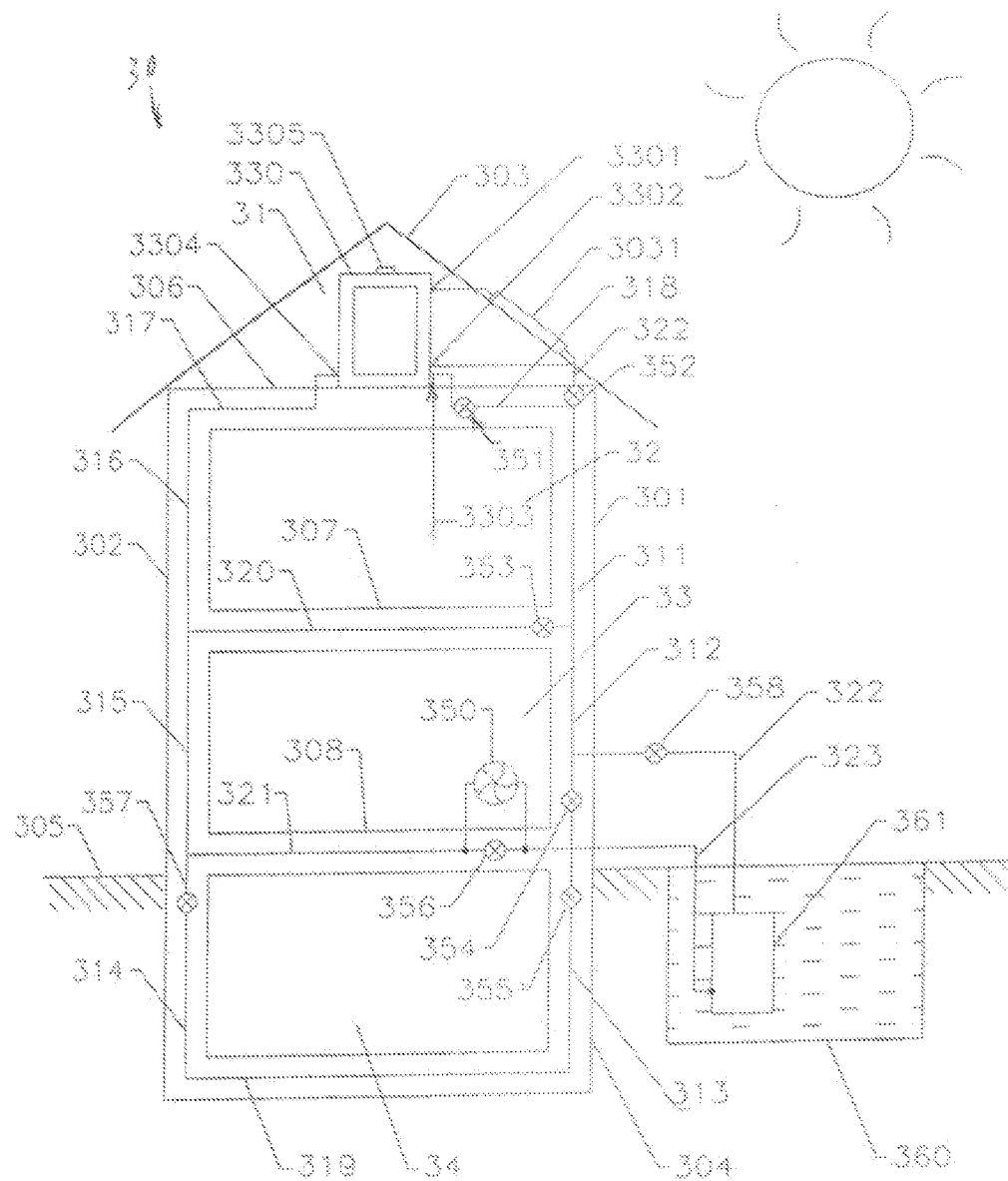
FIG. 3-C

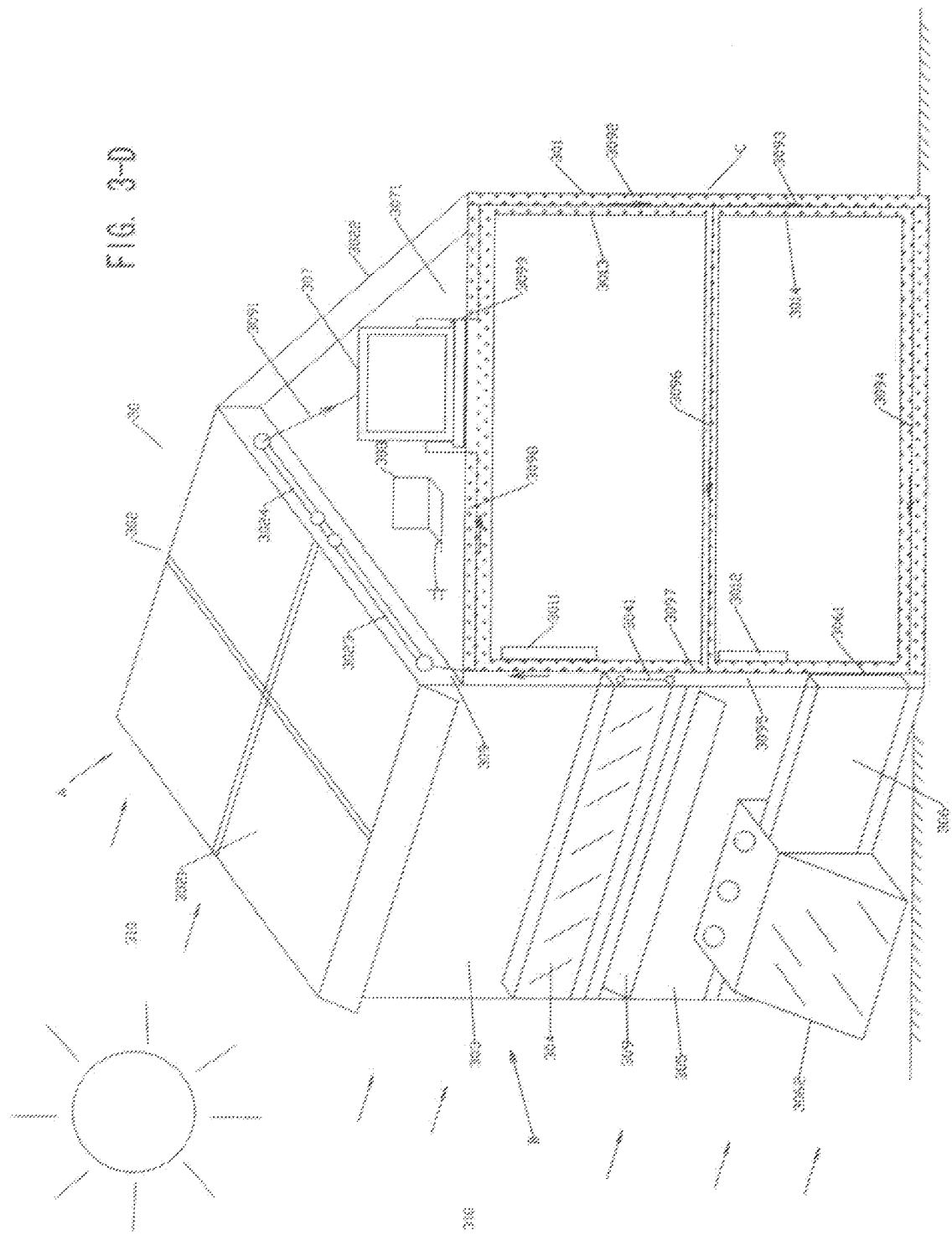

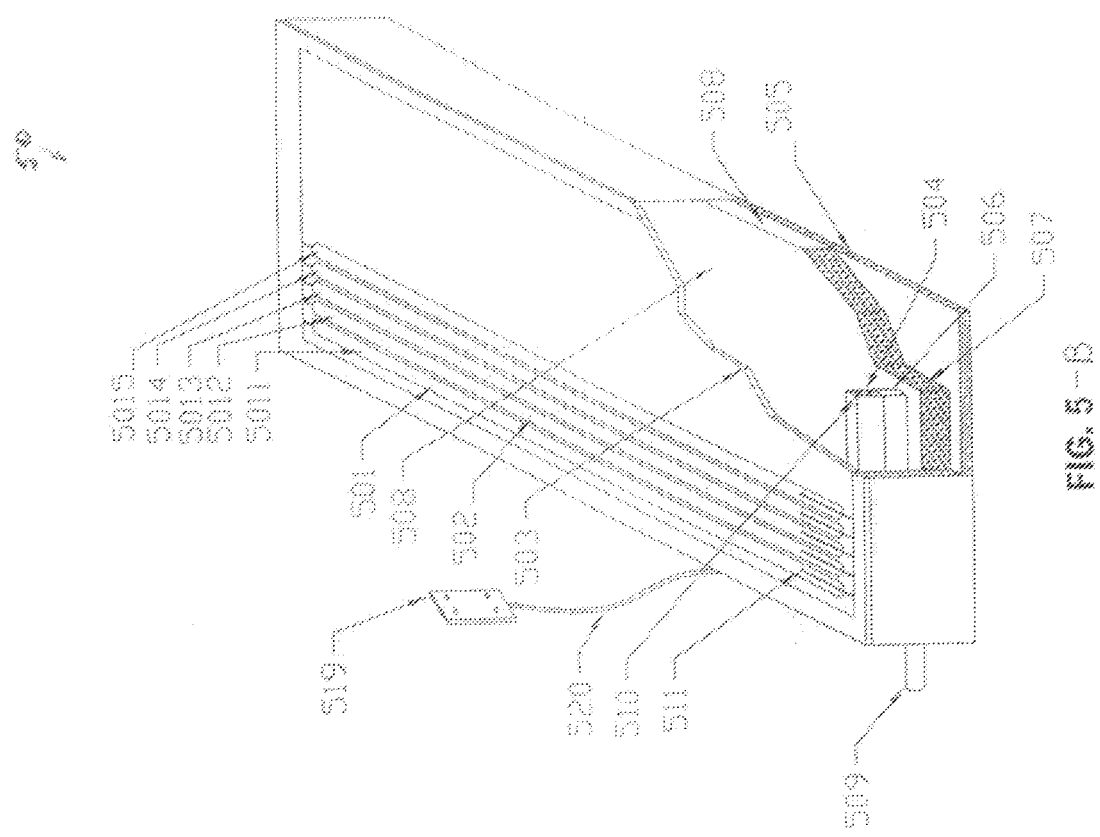

INSULATING GLASS STYLE SOLAR HEAT COLLECTOR AND BUILDING USING SOLAR ENERGY FOR HEATING AND COOLING

TECHNICAL FIELD

This disclosure relates to solar energy application, i.e. solar heat used for building. This disclosure especially relates to the use of existing and new released building elements for solar heat collecting and storing. The absorbed solar heat is used not only for building heating but also for building cooling. The new building elements include device integrated solar heat collecting with solar heat storing; insulating glass style solar heat collector (IGSHC) and window blind style solar heat collector etc.

BACKGROUND

Recently solar heat has being used in many buildings mainly for solar water heating and space heating. There is also solar cooling equipment for buildings. Usually the solar energy application in a building needs separated and extra equipments. Some of these equipments may be complex and expensive. For example, to heat water or space, an independent solar heat collector and independent solar heat storage are required. To cool a building, a expensive air conditioning equipment (such as compressor and condenser) and electricity may be required. A simple space-heating device, for example a Trombe wall also needs a heat absorber on the front of the building wall. All of the above-mentioned equipments require materials to make and need energy for manufacture and transportation. This is opposite to our goal to use solar energy for energy saving.

In fact, any building has many building elements that face to sunlight. There are enough surfaces to absorb solar energy and the absorbed heat is enough for the demand of hot water, space heating and cooling in the building at a sunny day. These building elements include wall, roof, floor, door, window, fence, deck, pillar, veranda, path, driveway, awning, brick, tile, covering of window, covering of door, solar heat collector, swim pool and a combination of them. Furthermore, the materials of the building elements also have large enough heat capacity to store the solar heat absorbed for use. These materials may include brick, stone, sand, soil, cement, metal, alloy, bitumen and reinforced concrete etc.

On the other hand, if we use the solar heat collector and storage equipment to replace building element, it also can save building materials and cost. Long time ago our forefathers used building elements for soar heating or cooling. The buildings in a high latitude area usually have a dark color and heavy wall to absorb and store more solar heat. The buildings in a lower latitude area usually have a light color wall to reflect the sunlight. This idea and arrangement has been used and continued until today. The above arrangement is not perfect. When we use a building to absorb more solar heat at cool seasons, the building needs more air conditioning energy at the hot season. Vice versa, when a building reflects most of the sunlight, the building will need more heating energy at cool season. If the absorbed solar heat not only can heat the building but also can cool the building automatically, then we can make arrangement to absorb the solar heat as much as possible at any seasons for two opposite requirements.

The purpose of this disclosure is to find a simple and cost effective way for using solar heat in a building not only for heating but also for cooling without employing any air conditioning device. So that existing building heating and cooling device may become a backup only. Thus the traditional energy consumption can be reduced significantly. The first idea is to collect and store the solar heat by building element(s) and materials for reducing the extra cost of the solar heat collector and storage equipment. The second idea is to use an existing or new developed solar heat collector and/or storage instrument as building element(s) for reducing the cost of building. The third idea is that the collected solar heat is transferred by a fluid, a mechanism is used to direct and control the fluid direction, speed and capacitance, thus we not only can heat the building, but also can cool the building. Furthermore, most of the goals can be achieved by solar heat driven automatic circulating (refer to our other inventions) to reduce the consumption of circulating power. Here said building is any building having an elements that can reach sunlight. The buildings may include commercial buildings, industrial buildings, agriculture buildings, residential buildings, education buildings and defence buildings etc.

Following is the brief introduction of the background of some new developed solar heat collector and building elements.

Solar heating including solar water and space heating of a building is used widely for industrial, commercial, agricultural and residential purposes. Most of the solar heating systems separate solar heat collecting device and storing device. For example, a swimming pool is a solar heat storage device, but its solar heat collector may be put on the roof of a building. A domestic solar heating system has a separated solar heat collector and a water tank, even though they are located very closely. This arrangement increases the heat loss in two devices and connecting tubes. It also increases the costs of equipment, installation, operation and maintenance. It is possible to integrate solar heat collecting device with solar heat storing device, because of the new technologies and products. For example we may add a solar heat absorb coating at a solar heat storing device e.g. a swimming pool or a water tank. Or we can put a flat solar heat storage tank in a solar heat collector. In either case, the cost of equipments, installation, operation and maintenance will be reduced. The solar heat may be used more popular.

Recently to reduce the climate change by humankind energy consumption, more and more renewable energies are used. For the application of renewable energies, we need to add some new equipment. For example, to use the wind energy we need wind turbine, tower and huge space. They need to consume energy first. The renewable energy equipment may also generate new pollution to earth. For example, the existing solar heat collector's insulation and the painting of the frame may be a new pollution source. Further more the existing building uses a lot bricks and concrete. They need huge energy to produce. When the building is out of the service, all the building materials become garbage. All the energy used for manufacture these building materials are wasted. This disclosure released a building element mainly made of glass. It is an insulating glass style solar heat collector. It not only strong enough like the existing building, but also consume less energy to manufacture. Furthermore the building element can collect the solar heat for building heating and cooling. After the service of the building, the glass and metal can be recycled easily and cost effectively. Even though the building is in operation, the solar heat collector can also be replaced or recoated.

SUMMARY

The present disclosure provides a building using solar energy for heating and cooling without employing air conditioning device. Said building comprises a building element absorbing solar heat, a building element storing solar heat, a fluid channel within said building element for a fluid to transfer solar heat and a mechanism leads and controls the flow of said fluid.

This disclosure also provides existing and new released building elements employed for building heating and cooling purpose. They are as follows:

A liquid heat storage device fluidly connects to the fluid channel in the building element to storage solar heat for hot water and/or space heating. The liquid heat storage device is also for removing the heated liquid from building element and providing the cold liquid to the building element to cool the building. The building further comprises a heat radiator fluidly connected to the fluid channel in the building element to cool the building.

A device integrated solar heat collecting with storing in one unit. Said device is selected from a group of: 1. A heat storage device has a wall having a solar heat absorb coating to collect solar heat. Transparent heat insulation allows the sunlight passing and reduces the heat loss. 2. A fully airtight sealed and water resistant solar heat absorber can be used to make a solar heat collecting and storing device. Said solar heat absorber can also be attached on a wall of solar heat storage device to absorb solar heat. 3. A plate solar heat collector, wherein a flat metal box replaces flat plate solar heat absorber. Said box has a wall having a solar heat coating. A heat storage material is placing in the box. 4. An integrated solar heat collecting and storing device has an energy saving vertical blind style solar heat absorber. The absorber comprises a group of slats having an adjustable orientation. A first side of the slats is for absorbing solar heat and a second side is for reflecting solar heat. A mechanism is used for controlling the orientation of slats. Said absorber can track the sunlight at daytime and reduce the heat loss at nighttime by an automatic controlling system.

An insulating glass style solar heat collector (IGSHC) has an insulating glass and the like. A solar heat absorber is arranged in hollow space of said insulating glass. The absorber separates said space into first subspace and second subspace. A fluid channel thermally connects with said solar heat absorber for heat transferring and a mechanism for directing and controlling the flow of said fluid.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate exemplary embodiments of this invention:

FIG. 3-B is schematic side view illustrating a liquid pool integrated with a solar heat-collecting wall;

FIG. 4-B is schematic side view illustrating an air inflated PVC liquid container integrated with a heat absorbing wall and bottom;

FIG. 5-B is schematic side view illustrating an exemplary solar heat collector using an energy saving vertical blind as its solar heat absorber and integrated with a solar heat storage tank;

FIG. 1-C is schematic side view of an exemplary building using solar energy for heating and cooling through air channel within brick holes of the building wall;

FIG. 2-C is schematic side view of an exemplary single floor building using solar energy for heating and cooling;

FIG. 3-C is schematic side view of an exemplary multi-floor building using solar energy for heating and cooling;

FIG. 1-D is schematic side view illustrating an insulating glass style solar heat collector and energy saving building element wherein a solar heat absorber arranged in an insulating glass, and said absorber having fluid channels;

FIG. 2-D is schematic side view illustrating another insulating glass style solar heat collector which having a solar heat absorber is removable from said insulating glass;

FIG. 3-D is a schematic side view illustrating an exemplary building using solar heat collector and building elements for building heating and cooling.

DETAILED DESCRIPTION

Figure 1:
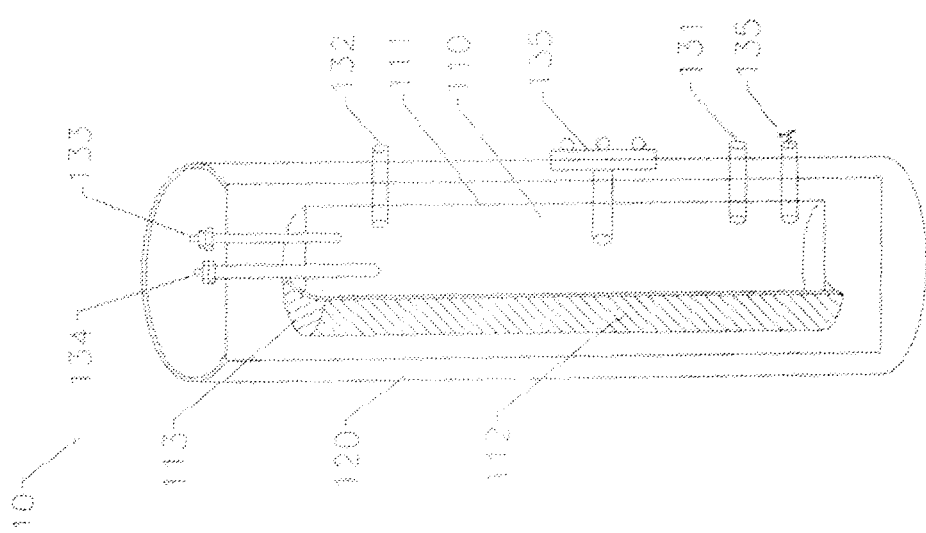
FIG. 1-B is schematic side view illustrating a liquid heat storage tank having a solar heat collecting wall.

Referring to FIG. 1-B, a liquid heat storage device having a solar heat-collecting wall is illustrated in side view. The device 10 comprises a water tank 110 having a stainless steel wall. There are selective coating on the sidewall 112 and top wall 113 to absorb solar heat. The selective coating comprises metal element e.g. titanium. The tank can be a pressured tank or a tank open to atmosphere. The device may have an automation controlling system like many solar heating systems did. A transparent glass or plastic covering 120 covered the tank 110. Similar to a regular water tank, the tank 110 has a cool water inlet 131, hot water outlet 132, release valve 133, anode protection bar 134 and a drain valve 135. When sunlight shines on the tank 110, the selective coating 112 and 113 absorb the heat and transfers it to the water in the tank 110. The transparent cover 120 allows the sunlight to pass through and reduce the heat loss. The tank 110 looks like the regular tank on the market. There are two differences. First, the insulation and protection covering is made of a transparent material. Second, the wall of the tank absorbs solar heat directly. Sometimes for a transportation cost reason, the transparent insulation and protection 120 can be detachable and is formed by two or more parts. A two layer air inflated PVC insulation and protection is cost efficient, easy for transportation and easy for replacement. This kind of full transparent cover lets the sunlight going through onto east side at morning, west side at afternoon and front at noontime. So the efficiency is high for all day. Furthermore if we put a transparent insulation at the front of the tank and put insulation with a reflective surface at the back, it will increase the absorbed heat. The transparent insulation may be a half cylinder evacuated glass. In a warm area, the transparent insulation and protection can be a transparent coating of glass, liquid glass, paint, ink oil, film, plastic or polymer. It also can be a PVC or a similar material's foil.

Figure 2:
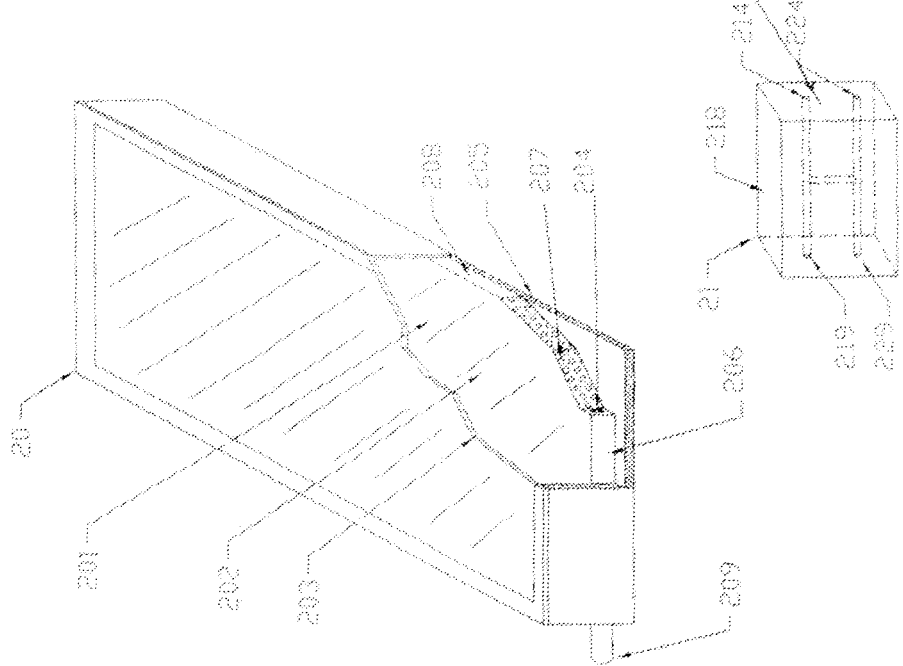
FIG. 2-B is schematic side view illustrating a flat plate solar heat collector integrated with a heat storage tank.

Referring to FIG. 2-B, a flat plate solar heat collector integrated with a flat plate heat storage tank is illustrated in side view. Comparing with the flat plat solar heat collector in the present market, the device 20 has many similar parts as follows: There is a solar heat absorber 201 with a solar heat absorbing coating 202. Here 202 is a selective coating comprising metal elements. A transparent glass cover 203 allows sunlight to arrive on the heat absorb coating 202 and reduce heat loss. Heat insulation 205 at the back and sides to reduce heat loss too. A fluid tube 204 is for transferring heat. It can be a simple tube to pass the heated liquid in the tank 208, a heat exchange tube such as U shaped tube and a metal tube with fins, or a heat tube.

There are also some significant differences. The solar heat absorbing plate 201 in FIG. 2-B is not a single plate. It is a front/surface wall 201 of a flat solar heat storage tank 208. This means a flat heat storage tank 208 with a solar heat absorbing wall 201 in the device 20 replaces the flat plate solar heat absorber in a regular flat plate solar heat collector. The tank 208 further comprises other sidewall 205 and bottom wall. In this case, the tank 208 is made of aluminum alloy. The device including tank can made of other metal, alloy, ceramic, plastic, polymer, wood, stone, porcelain, glass, concrete and a combination of two or more above-mentioned materials. Furthermore there is a heat storage material 207 placing in the tank 208. The heat storage material 207 can be a solid material, e.g. sand, a fluid material e.g. air, anti-freezing liquid and water, or a phase change material e.g. paraffin. It also can be a combination of two or more of above-mentioned materials. Not like a convergence tube in an existing flat plate solar heat collector, here the tube 204 is a heat exchange tube such as a single copper tube, a U shaped tube or a metal tube with fins that arranged within heat storage material 207 to transfer the heat by fluid. When the device always operates at an environment with a temperature above the freezing point, water can be used as the heat storage material. In this case, an inlet at lower place and an outlet at higher place of the tank can replace the heat exchange tube to transfer the heat for use. An inlet fitting and an outlet fitting are arranged on the wall of the tank. They can be used either for heat exchanger or for water flow directly. Now we can make arrangement to let water pass through the tube 204 to get solar heated hot water. We can also let air pass through the tube 204 to get solar heated air for space heating. Further more an air inlet and an air outlet are arranged at the wall of the device 20 respectively (not show in the Figure). When the cool air passes through the upper surface 201 or a channel arranged in tank 208, the air will be warmed. The warmed air can be used for space heating or industry processing. In this case the device 20 can generate the solar heated hot water and/or warm air at the same time. So that it is a multifunction solar heat device. To let the device works properly and automatically, the device may have an automatic controlling system like many solar heating systems did. Sand, water and antifreeze are good heat storage material too, if the tank is made of stainless steel.

When sunlight passes through glass plate 203 and arrives at solar heat absorbing plate 201, heat is absorbed and transferred to the heat storage material 207 through the aluminum alloy plate 201 and other sidewalls. When we need the heat, let fluid, e.g. water, passing through the tube 204. The heat will be transferred. The aluminum alloy is a very good heat conductive material. The fluid tube 204 connects to the aluminum plate 208 closely or the tube is part of the aluminum plate. The heat in sand 207 can be transferred to the fluid in the tube 204 quickly.

The containing load of the heat storage tank varies based on the system design. If the system has a liquid pump to pump the liquid frequently, the load may be smaller. Otherwise the containing load needs to be larger. In the second case a heat conducting material, a heat tube or a fluid tube may be installed in the heat storage material to speed up heat transferring.

At the right corner of FIG. 2-B an alternative arrangement for liquid tube 204 is provided in 21. The single fluid tube 204 in 20 is replaced by a 'I' shaped tube group. The tube group has four ports 214, 219, 224, and 229 distributed on the walls of the tank. There are two spare bolts for closing two ports that are not in use.

This arrangement not only make the heat transferring from sand 207 to tube 204 easier, but also more flexible for field installation.

In this case because the heat storage material is a solid material, so there is no risk of liquid freezing at winter if there is no liquid in the tube 204. In some cases, the tank 208 can be filled with heat storage liquid, e.g. water, and there is no need of the tube 204. One inlet and one outlet at the wall of tank are enough.

Referring to FIG. 3-B, a stainless steel liquid reservoir 30 is illustrated in a schematic side view. The reservoir may be a swimming pool or other processing pool. The liquid reservoir 30 has a sidewall 301, bottom wall 302 and an open top. There is heat insulation 303 for the sidewalls and bottom wall. The reservoir may be under ground or above ground. Stainless steel sheets form the sidewall 301 and bottom wall 302. An enlarged side view of the sheet is shown in 31. There are 4 layers 311 to 314 plus the heat insulation 315. 314 is stainless steel sheet. 313 is a selective coating comprising titanium. We select titanium because its coating color is blue. Comparing to a dark color of other metal coatings (e.g. chromium and aluminum), blue is better for swimming pool. Usually the metal coating has a glass protection layer. It is 312. Out of 312, it is a transparent paint 311 added after field construction.

Sometimes we need a reconstruction swim poor made of concrete or fibreglass. In this case a full airtight sealed and water resistant concrete brick can be a mosaic material of the walls. We still use 31 in FIG. 3-B to describe it. Here 315 is a existing concrete wall, 314 is a concrete brick or tile, 313 is a heat collecting coating, 312 is a protection in manufacture and 311 is a food class paint after field construction. The full airtight sealed and water resistant solar heat absorber can be used in many building places as a part of element too. The absorber can be made of many materials. For example they may be a metal sheet, a brick, a glass, a tile, a floor tile, a gypsum tile, a ceramic tile, a stone, a concrete, a reinforced concrete, a plastic, a polymer, a porcelain, and a combination of above one or more mentioned materials. Sometime we can make the reconstruction or new construction of a swim poor very simple and easy. We can simply put solar heat absorbing sheets on the bottom and/or sidewall of the swim pool. One side of the sheet has solar heat absorbing coating. A transparent water resistant protection is arranged on the solar heat absorbing coating. Said side can become submerged within water. The material of the sheet can be any material of the material of above-mentioned absorber. We can also simply put transparent sheets (like the sheet of glass, transparent plastic and polymer) on the bottom and/or sidewall of the swim poor. One side of the transparent sheet has a solar heat absorbing coating. The opposite side of the transparent sheet can become submerged within water. This idea can be used for all liquid containers that need solar heat. For safety reason, the glass used in this case needs special processing (e.g. laminated). Or the solar heat absorbing coating may be laminated between two layers of grass.

In FIG. 3-B, 32 is a schematic side view illustrating an air inflated transparent plastic cover. The cover is made of a food class plastic film for food wrap. Here 321 is top layer. 322 is bottom layer. 323 is an air injection mouth. The bottom layer is floated on the liquid surface to reduce heat loss through liquid vapor. The air gap between 321 and 322 is for reducing heat loss through heat conduction. The cover 32 may be one entire cover for a reservoir. When the liquid reservoir is large, the transparent cover 30 may consist of a group of covers. 323 is for air injecting and releasing. A cord to string the sub-covers may be necessary.

When sunlight shines on the reservoir 30, the sidewall 301 and bottom wall 302 absorb the solar heat and transfer the heat to the liquid within the reservoir 30. The heat insulation 303 reduces heat loss through sidewalls and bottom wall. The bottom layer of cover 32 is floated on the liquid surface to reduce heat loss through liquid vapor. The air gap between 321 and 322 reduces heat loss through heat conduction to atmosphere. So the solar heat liquid reservoir has a high heat collecting and storing efficiency.

Referring to FIG. 4-B is schematic side view illustrating an air inflated liquid container 40 integrated with a heat absorbing wall 401 and a bottom 403. This liquid container has a similar mechanical structure as the PVC swim pool in market. There are air inflated inner wall 401 and outer wall 402. There is a single layer bottom wall 403. Following are the differences of liquid container comparing with the PVC swimming pool in market:

1. The wall 402 and 403 are made of transparent material e.g. transparent PVC.
2. The inner wall 401 and bottom wall 403 has a solar heat absorbing coating. Here it is black rubber coating. The coating may other color coatings. They are located at the outer side or covered by a food class PVC. So the coating does not contact the liquid in container directly.
3. The container has a removable transparent air inflated cover 41. The cover 41 has a top layer 411 and bottom layer 412 and an air injection mouth 413. The function of the cover has been described in details in FIG. 3-B. The cover 41 may also be one layer PVC. Its heat insulation efficiency is not as good as a cover of two layers.
4. There is a bottom heat insulation pad 42. It is foldable for the purpose of packaging and transportation. Some time a top layer 421 cover the insulation 422 of the heat insulation pad and has a solar heat absorbing coating. Here it is a titanium coating on an aluminum foil. 422 is regular foam plastic. In this case the bottom 403 is a single layer transparent PVC. The reason for this arrangement is as following: 1. Most of the coatings on PVC are in dark color. Our pad is in blue and has a better color. 2. This arrangement reduced the unit weight of the container 40. Of cause a solar absorbing coating on the outer layer of 403 is also a selection of arrangements.

When sunlight shines on the container 40, the solar heat is collected by the coating on the sidewall 402 and bottom wall 403 of the container and transferred to the water in the container 40. The bottom insulation 42, the inflated air in sidewall 402 and the cover 41 reduced the heat loss. It is similar as in FIG. 3-B. This kind of the swimming pool can work longer time every year.

The material of the container 40 is not only PVC. Any other transparent polymer materials can be used as 402 and 403 too, if they are safe. We can add some accessories to the container such as a solid cover, an inlet and a outlet, connection tubes etc. The container will not only can be used as a air inflated swimming pool, it also is a simple solar heat collecting and storing device. The device is cost effective and easy to move, install and use.

Referring to FIG. 5-B, an exemplary solar heat collecting and storing device 50 is illustrated in schematic side view. Said device uses an energy saving vertical blind as its solar heat absorber.

The solar heat collecting and storing device 50 has a transparent cover 503 that allows solar energy to pass through but reduce heat losses. Here cover 503 is glass. It can also be other materials like transparent plastic or polymer. The transparent cover may have two or more layers or may be an evacuated glass in a cold area. There is also a heat insulation backing 505 to reduce the heat loss. 505 is a regular insulation material or a transparent plate with an air apace.

The first key element of this disclosure is an energy saving vertical blind style solar heat absorber 501. 501 is not a simple flat plate absorber. It is a group of vertical slats arranged one next to another under the transparent cover. Slats 5011-5015 are part examples of the slats. The first side of the slats has a solar heat absorbing coating 502. It is a coating same as a flat plate solar heat collector available in the market such as a coating comprising titanium. The second side of the slates has a reflective coat or a polished metal surface. A heat tube 511 having its one end attached at the heat-absorbing slat 5011 and an opposite end extended into a head rail 506. Here the heat tube will transfer collected heat to the heat storage material 507. In head rail 506 there is also heat converging tube 504 to transfer the heat for use. Other heat tubes have similar arrangements. An end of the heat converging tube 504 is 509.

The head rail 506 holds the slats and guides their movement. All the slats are overhung under the head-rail 506. The solar heat absorber 501 has a similar working idea of an energy saving vertical blind. The slats 5011-5015 of the blind can be rotated through 180 degrees by stretching out and drawing back a rotating angle control cord 520. The first side of the slats has a solar heat absorbing coating 502. It is a coating same as a flat plate solar heat collector available in the market.

The second side of the slates has a reflective coating. A mechanism for controlling the orientation of the slats is hidden in the head-rail 506. An automatic controlling system 519 can be connected to the control cord 520. The controlling system 519 comprises a micro motor, a hardware and a software to control the orientation of the slats based on sunlight incident angle or location, date and timing of the device. Of course both manual and automation operation for slats 501 are available at any time. The second key element of this disclosure in FIG. 5-B is a heat storage container 508, where a heat storage material 507 is stored. Here it is a flat aluminum box 508 filled with sand 507. The heat storage material can be a solid material, a liquid material, air, a phase change material or the combination of above mentioned two or more materials. Because the sand is easy to get in many places and can be installed in the field, so it may do not need transportation. Further more many solid heat storage materials (like sand) have no freezing risk in the winter.

It is valuable to have a high efficient coating on the second side of the heat absorber 501. It will significantly reduce the heat loss of the tank 508 by radiation, especially if the temperature difference is large between heat storage box 508 and the environment. The reflecting side not only works at daytime, but also at nighttime.

When the sunlight shines on the solar heat collector 50, the first side of slats 501 absorbs the heat and transfers it to the heat storage material 507 in the heat storage container 508. The absorber 501 is a group of slats and their orientation is adjustable and controllable. The control system lets the slats face sunlight at an optimum angle at any time. It will significantly increase the heat collection efficiency of the system. There are some existing devices in the market, which rotate solar heat collector to follow solar movement.

The device needs a power to move the entire solar heat collector. The disclosed system needs a power to rotate the slats only and it is much easier to operation and can save energy. The idea to rotate slats instead to rotate entire devices is an idea that can be used for PV panels and other sunlight collecting and reflective equipments. In the example 50, we can remove the heat storage container 508. In this case it is a flat plate solar heat collector with an energy saving vertical blind style solar heat absorber. We also can remove the heat storage container 508 and replace the heat insulating back 505 with a transparent plate 505. Then it is a two layer glasses with a vertical blind style solar heat absorber. We also can remove heat container 508 and heat insulation back 505. In this case, the device 50 is a window with an energy saving covering. Further more, we can remove 505, 508, 503 and the frame of the device, then leave only the solar heat absorbing slates and the rail. In this case, it is an energy saving blind with heat tube. If we further remove the heat tubes 511, then it becomes a vertical blind having solar heat absorbing coating in one side and its opposite side can reflect solar heat.

According to above discussions we conclude the follows:
1. Either a solar heat collector or a solar heat storage tank can be reconstructed to be a solar heat device integrated solar heat collecting with solar heat storing.
2. In FIG. 1-B and FIG. 2-B we disclosed a cylinder device and a flat plate solar heat collecting and storing devices. This makes it easy to use existing machine tools and skilled workers. In fact any shapes can be used for the new devices. For example a cone shaped heat collector may be better than a cylinder shaped collector in the future.
3. As mentioned there are many different heat storage materials that can be used in our device. They include solid, liquid, gas and phase change materials.
4. The integrated solar heat collecting and storing device uses single heat insulation for both solar heat collector and heat storage tank. It not only saves the material, but also reduces heat loss.
5. In the above drawings, we used many walls of the device as a solar heat absorbing walls. They are sidewalls, top walls, inner wall and outer wall. In fact any wall can reach sunlight, it can become a wall to collect solar heat.
6. The disclosed integrated device may become a part of a building element. The building element includes building wall, roof, door or window etc.
7. We can also set up a solar cooking place in the heat storage material of the integrated device for solar cooking.

Refer to FIG. 1-C, it is a schematic side view of an exemplary building 10 using solar energy for heating and cooling through air channel within brick holes of the building wall.

The building 10 has a sunny wall 101 and opposite wall 102. Perforated bricks in dark color (e.g. red or gray) build the walls. (as showed wall 102 in FIG. 1-C, the hollows are not in series). The bricks are regular bricks or bricks with a solar heat coating. Some holes in bricks are connected in series to form an air channel 103 in the wall. Air gaps/gates 104, 105 on the sunny wall connect the channel 103 with the building space 110. Air gaps/gates 106, 107 and 108 connect to atmosphere outside of the building. The gaps/gates 106, 105 and 104, 107, 108 are located at the highest, high and lower levels respectively as shown in the Figure. Each gap/gate has a cover to open or close the gap/gate.

Refer to 11 in FIG. 1-C. It is a copy of building 10, here 106 and 108 are closed by their covers. When the sunlight heats the wall 101, heated air in channel 103 rises up and enters into higher space of the building through gap 105. Cooler air in a lower space of the building enters into the channel 103 through gap 104. To continue this processing, the space 110 including wall 102 will be heated. This is a case using solar energy to heat a building space. In this case, air pressure in space 110 is positive. There is no air entering into the space 110 through gap 107. The gap 107 helps air pressure balance in the space 110. Refer to 12 in FIG. 1-C. It is a copy of building 10, here the gap 106 is opened and the gap 108 is closed. The gap 107 is connected to a shadow place or a tube having a part under ground or water. (not shown in FIG. 1) When sunlight heats the wall 101, heated air in the channel 103 rises up and goes to outside of the building through the highest gap 106. The complement air from the space 110 gets into channel 103 through gaps 104 and 105. It causes cooler air comes to the space 110 through gap 107. Because the air through gap 107 is from a shadow of the building or it may further go through a tube under ground or water, so the temperature of the air is lower. The air will cool the building space 110. This is a case using solar energy to cool the building space without any extra power and machine except solar heat. If we close the gaps 104 and 105 and keep the gaps 106 and 108 open, the solar heated air in the channel 103 will be forced to flow from 108 to 106 and reduce the heat in the wall 101. So that the building is also cooled.

This is a very simple example how to heat or cool a building space through three steps. 1. To arrange an air channel in a sunny wall of a building. 2. To add some gaps at the wall which connected to the channel. 3. To control the opening or closing of the gaps. In this case, solar heat received by the building wall forces, directs and controls the airflow to heat or cool the space. No any extra energy is required except the solar heat itself. Even though the solar energy efficiency in this case is not very high, but the cost of this arrangement is very low. Because it can use existing building design and materials and there is no need to add extra expensive equipment and material.

In fact, the building walls are not necessary to be built by bricks. Soil, cement, glass, metal or other materials can be used to build the walls if channel and gaps can be arranged in the walls. The building walls may have or without solar absorb coating. The building walls also can have or without transparent cover. The wall can also be any other building element as mentioned in this file. Furthermore the building wall can be built by using solar energy heating devices disclosed in this application such as device integrated solar heat collecting with solar heat storing and recyclable solar heat collector and building element. In that case, the bricks in FIG. 1-C can be replaced by solar energy heating devices. The holes of bricks are replaced by the channels or the spaces in the devices. They are 504 and 509 in FIG. 5-A, 206 in FIG. 2-B, 106 in FIG. 1-D and 206 in FIG. 2D. These channels and following spaces can be connected to form channel like 103 in FIG. 1-C. Said spaces are the spaces 1071 or 1072 in FIG. 1-D and the space between 203 and 202 in FIG. 2-B, the space connected to 2093-2094 in FIG. 2D. The new channels like 103 can be used to flow solar heated liquid and air.

FIG. 2-C is schematic side view of an exemplary single floor building 20 using solar energy for heating and cooling. The building 20 may be a single layer building, a trailer or a top floor of a multi-floor building. The building has a sunny wall 201, an opposite wall 203 and a sunny roof 202.

A wall 205 separates the building 20 into two spaces 206 and 207. First layers 2011 and 2021 of the wall 201 and 202 are two transparent coverings. Second layers 221 and 222 are solar heat absorbing plates. 241 and 242 are heat insulations. There are building materials in the space between solar heat absorbing plates and heat insulations. The building materials may be sand, stone, bricks, cement etc. In this case, they are simply bricks or cement. In this case, the bricks of the walls and the tank 215 form a heat storage bank of the building. The solar heat absorb plates 221 or 222 is a metal plate with a solar heat absorbing coating. The wall 203 has a surface plate 2031, heat insulation 243 and building materials 233 in between of 2031 and 243. The building has floor surface 244 and building materials 234 (such as sand, stone, glass, brick, soil, cement, reinforced cement, metal, alloy, bitumen, wood, plastic and a combination of two or more above-mentioned materials) under the floor surface. The bottom floor 204 is not heat insulated, so that the heat stored in the floor 234 can be transferred to the spaces 206 and 207. Within the building walls 201, 202, 203 and floor 204 there are liquid tubes, e.g. metal or cement tubes, 211, 212, 213 and 214 filled with liquid. The liquid may be water or antifreeze. Here it is water. The tubes also can be hollow pillars. The water tubes 212 and 213 have one end connect to the tank 215 respectively, in this case, it is a heat driven liquid self-circulating device. There is a water control valve 216 that connects to the tube 212. Within the building material 232 of the building top wall 202, there is a water fin tube 251 connected to the hot water appliances 252 and 253. The cold water inlet of the fin tube is not shown in FIG. 2-C. The walls 201 and 202 can be fully or partially replaced by the new released solar heat collectors introduced in this application. The operation processing will be similar. Some examples of the collectors are shown in, FIG. 2B, FIG. 5B and FIG. 1-D. FIG. 2D. They also have transparent layer, heat absorber layer, heat insulation and fluid channel. In this case (FIG. 2-C), the heat bank of the building is formed by tank 215, walls 201, 202, 203 and 204 and the connecting liquid tubes 211, 212, 213 and 214.

When the sunlight heats the solar heat absorbing plates 221 and 222, the solar heat is stored in the building material of the walls 201 and 202. The following is a discussion of some cases:

1. When the tubes 211, 212 and 213 have no water, the heat absorbed in wall 201 is stored in the material 231. The heat absorbed by 222 is stored in the material 232. When we need hot water, to let cold water passes through the fin tube 251, the heat in the storage material will heat the water for use.
2. When the tubes 211, 212, 213 and 214 are filled with water and the valve 216 and 217 are turned off, the solar heat absorbed in plate 221 will be transferred to and stored in the building material 232 of the top wall 202 through tubes 211 and 212.
3. When tubes 211, 212, 213 and 214 are filled with water and the valve 216 and 217 are turned on, the solar heat absorbed by wall 201 heats the water in the tube 211. The heated water rises up to tube 212 and is further heated by heat absorb plate 222. The further heated water flows though the heat driven self-circulating device 215 and is circulated in a close loop system formed by tubes 211, 212, 213, and 214. The solar heat is transferred to the building materials and heat storage materials 231, 232, 233 and 234 in the walls 201, 202, 203 and the floor 204. The heat received by floor 204 is also transferred to the spaces 206 and 207 to heat space of the building. To control the water capacitance, flow speed and temperature in the device 215, the water temperature in the tube network 211, 212, 213 and 214 can be controlled, so that the temperature of space 206 and 207 can be controlled.
4. When tubes 211, 212, 213, 214 and the heat driven self-circulating device 215 are filled with water and the valve 216 is turned on, but valve 217 is turned off, the solar heated water in tube 211 will rise up and is further heated in the tube 212, then flows into heat driven self-circulating device 215. In this case, the device 215 is a double layer wall water tank. The cold water in the tank 215 will take off the solar heat in the water from the tube 212. The cooled water in the bottom from 215 will return to tube 212 and then the tube 211 to cool the wall 201. Therefore the building 20 is cooled. The heated water in device 215 can be used as hot water and/or for space heating. Similar in case 3, to control the water capacitance, flow speed and temperature in the device 205 also can heat or cool the building wall. So that the temperature of the building can be controlled, either for the building heating or cooling.

The above-mentioned heat driven self-circulating device may include a double layer wall liquid tank, a liquid tank with a heat exchanger or a self-powered pump etc. These devices have been disclosed in our prior patents and pending patents. Some time the heat driven self-circulating device can have a detachable insulation and an open top cover. When the temperature of water in the device 215 is too high, the device 215 can take off the insulation and become a heat radiator. Further more we may also open the top cover to cool the water in the device further by vapor.

In some cases we can also use hollow pillars and beams of the building as both the fluid channel and heat storage element. The pillars/beams need to be insulated. If the fluid is water, we can get the hot water from the pillars/beams directly. If the fluid is air, the heated air from a valve can heat a space.

The wall 201 and roof 202 can be replaced by a set of plate solar heat collector filled with or without solar heat storage material. The solar heat collector includes the collectors disclosed in this file. The wall 201 and roof 202 can also be replaced by three solar heating devices. They are the solar heat collector integrated heat collecting with storing, the recyclable solar heat collector and building element, as well as energy saving covering for buildings. Every device of the three devices has a fluid channel. To connect these channels can form the channels 211, 212 and 213. So there is no material difference between the case discussed in FIG. 2-C and the cases using the new solar heating devices. In a cold area (high latitude area), some time we also add a solar heat absorber in the wall 203. Because reflected sunlight of snow can heat a shadow wall, where sunlight never directly shines. Especially when the building uses any energy saving device of the three solar heating devices, the indirect solar absorbing of wall 203 should be considered. The devices can save the energy for space heating in the winter. In the cold area, all the devises, methods/ideas and processing of solar heat application for sunny wall/roof discussed in this file can be used in the walls where sunlight does directly shine.

FIG. 3-C is a schematic side view of an exemplary multi-floor building using solar energy for heating and cooling. The building 30 has a space 31 under roof, second floor space 32, first floor space 33 and basement space 34. It has a sunny wall 301, an opposite wall 302, roof 303, basement wall 304 under ground and a top wall 306. A part of the roof 303 is 3031. It is a solar heat collector or a set of fully sealed solar heat absorbing tiles. Sunny wall 301 can absorb solar heat. It is a red color cement wall with a transparent plastic coating in this case. In the walls water tubes 311, 312, 313, 314, 315, 316, 317, 318, 319, 320, 321 and 322 are arranged. They connected each other and connected to a heat driven self-circulating device 330 as shown in FIG. 3-C. The tubes are made of metal or cement.

As shown in FIG. 3-C, control valves 351, 352, 353, 354, 355, 356 and 357 are arranged for controlling the liquid flow in the tubes. The valves can be controlled manually and automatically. By controlling these valves, the water system can operate in different conditions for water heating, space heating or space cooling. There is also a device 350. It is an electrical pump with an automatic control system. The automatic control system set up the operation conditions of the valves based on preinstalled control program and data collected by sensors. The liquid system mainly is driven by solar heat. If it is necessary, the control system will also put electric powered pump in operation. The building also has an air condition system. The air condition system cools and heats the building using solar heat firstly and other energy sources secondly. The other energy sources include electricity, gas, oil, coal etc. The air condition system is not shown in FIG. 3-C.

In the space 31 there is a heat driven self-circulating device 330 on the top wall 306 and under the roof 303. It is a liquid tank, double layer wall water tank or a liquid tank with a heat exchanger. The tank has a cold water inlet, a hot water outlet, a release valve, a drain valve and one or two electric heater(s). They are regular configurations, so abovementioned parts of the tank are not shown in FIG. 3-C. The tank can be a device for power system demand management purpose. The tank can heat the water at low power demand period and use the heat at high power demand period. It can help to reduce the electric power generation capacity for power system and reduce the cost for client. In this case, the heat bank of the building is formed by the walls (301, 302 and 304), the tanks (330 and 360) and the liquid tubes.

The water tank 330 has ports 3301 and 3302 in the outer layer wall. They connect to solar heat collector 3031 through connecting tubes. A port 3303 connects to an end of tube 318. A port 3304 connects to an end of tube 317. The tank 330 further includes a detachable insulation (not shown in FIG. 3-C). There is also a spare bolt for closing a breathing port 3305 of the tank 330. The tank 330 is a heat storage tank when heat insulation is on the tank. The tank can also be a heat radiator when the insulation is detached. In our case the solar heat collector 3031 and heat storage tank 330 are separated. The wall 301 not only is a solar heat collector, but also a heat storage device. They are integrated in one unit.

At the front of the building there is a water reservoir 360, e.g. a swimming pool. An airtight container 361 is located in the pool. A higher port connects to tube 312 through a connecting tube 322. A lower port connects to an end of tube 321 through a connecting tube 323. Here the airtight container 360 is a heat radiator. The pool 360 and the airtight container are required, because following reasons:
1. The building 30 has no basement or basement wall to be used to store or radiate solar heat.
2. The swimming pool needs solar heat collected by building elements to heat the water.
3. The building needs the water in the pool to cool the walls.

This swimming pool is a solar heat collector integrated with heat storage as discussed in FIG. 3-B. The bottom wall and sidewall of the pool have solar heat absorbing coating for absorbing solar heat in the pool to warm water directly. A transparent cover insulates the heat loss, if it is necessary. The solar heat absorb coating can be on one side of a transparent glass. The opposite side of the glass can become submerged in the water. Or the coating is on the side that faces sunlight and can flood in the water. Some time, to protect the coating, a top extra transparent coating may require. In the second case, the absorber material can be metal, ceramic, cement or stone etc. The swimming pool may also include a heat pump (not shown in the Figure). The heat pump can extract heat from the solar heated water in the swimming pool to heat air and water for the building. The heat pump also can become air conditioning to remove heat from the building and rejecting it to the swimming pool. Comparing to use the heat in ground and ground water, it is more environmental friendly and cost effective to use the heat in a solar heated swimming pool. If there is no water reservoir, we also can arrange the airtight container 361 under ground directly.

Some time the pool 360 can also become a heat source to heat the building. If the walls of the pool 360 have a solar heat absorbing coating and the pool has a transparent covering, then water temperature in the pool 360 may higher than the temperature of the wall 301. Then the warmer water in 361 will rise up automatically to heat the wall 301. In this case the pool 360 is the solar heat collector integrated solar collecting and storing as disclosed in FIG. 3-B.

Following are some cases exemplarily discussing how to use solar energy for heating and cooing of building 30.
1. To turn off all valves 351, 352, 353, 354, 355, 356, 357, 358 and pump 350. The solar heat absorbed by wall 301 is for heat building and stored in the wall 301 and 306. The heat received by roof 3031 is stored in the tank 330 for heating hot water. In this case, the channels in the building are not very useful.
2. To turn on the valve 352 and turn off all other valves and the pump. The heat absorbed by wall 301 preheats the water in tube 312 and 311. The heated water rises up to the tube 322 through the valve 352. In the roof solar heat collector 3031, the preheated water is further heated. Then the water flows into the outer layer tank of tank 330 through inlet 3301. Here the hot water gives up the heat to water in the inner tank and flow back to tube 311, 312 through outlet 3302—the tube 322—the valve 352—the tube 311 and 312. In this case, the solar heats collected by both wall 301 and roof 3031 are for heating hot water in tank 330. At the same time, the solar heat absorbed by wall 301 is transferred to tank 330. So that the wall and building is cooled.
3. To turn off the valves 352, 355, 357, 358 and the pump 350, and turn on valve 351, 353, 354, 356. In this case the solar heat collected by roof 3031 is stored in the tank 350. It is the same as case 1. The solar heat collected and stored by the wall 301 heats the water in the tube 311 and 312. The heated water rises up into the tube 318, then passes through the heat driven self-circulating device 330 and flows to the tube 317, 316, 315, 320, 321, 312 and 311. So that the collected solar heat is transferred to the space 32, space 33 and heats entire building.
4. To turn off the valve 352, 353 358 and pump 350 and turn on the valve 351, 354, 356, 355 and 357. In this case, the solar heat collected by the wall 301 generates a heat driven power to circulate the heated water in a close-loop 312-311-318-317-316-315-314-319-313-312. So that the collected solar heat can be transferred and stored in the walls 301, 306, 302 and 304. It also can be transferred to earth through wall 304. At nighttime and cold weather the heat stored in the basement wall 304 and earth can heat the water in the tube 313, 319 and 314 to warm the building.

5. If the building 30 has no basement or the basement wall has no tubes, we need to use outside under ground/water airtight container to cool the building. To turn off the valves 352, 353, 356, 357, 355 and turn on the valves 351, 354, 358 and power pump 350. In this case, the pump circulates the heated water in the tubes 311 and 312 through a loop 312-311-318-317-316-315-321-323-361-322-312. The heat radiator 361 transfers the solar heat to water in the pool 360 to warm the swimming pool and cool the building.

From above discussed cases, we can find that the absorbed solar heat by building elements like wall and roof not only can heat water and space, but also can cool the building. The heated liquid circulation not only can rely on an electric power pump, but also can rely on the solar heat energy itself. Even though there are only five exemplarily cases been discussed, but we can change the valve/pump numbers and locations to get many more operation cases and achieve more purposes. If we add some sensors and an automation controlling system to operate the system based on a computer program, the solar energy application will have a higher efficiency. Furthermore, the solar heating and energy saving devices disclosed in this application can be used in building 30-C. For example, all the walls can be replaced by the solar heat collector integrated heat collecting and storing and/or the recyclable solar heat collecting device and building element partially or entirely. Some samples of these devices are showed in FIGS. 5-A, 2-B, 5-B and 1-D. The roof 303 and the solar heat collector 3031 in FIG. 3-C can be replaced by the recyclable solar heat collecting device. One of the examples is shown in FIG. 1-D. In this case, the energy saving roof not only can generate hot water, but also can heat air for space heating directly. Of cause the energy saving covering can also be used in the building for heating or cooling the building. Because all above mentioned solar heat and energy saving devices have the fluid channels, so the operation of the building 30 has no material difference comparing to the operation discussed above for building 30. The example of FIG. 3-C takes an entire building as one unit to be heated and cooled by solar energy. In fact we can separate the entire building into several floor or room units to heat and cool. The control systems will be much simpler. The building elements for collecting and storing solar heat not only include wall and roof, but also include pillar, veranda, window, door, deck, awning, fence, path, driveway, brick, tile etc All of building elements can be used for collect and/or store solar heat. All of them can be replaced by the solar heat and energy saving devices disclosed in this application.

From the discussions of above examples, we also can find that to heat or cool a building, the fluid channel can be an existing channel in a building (e.g. FIG. 1-C), a new added channel like a channel made of metal, cement and ceramic etc. They also can be a channel designed in the solar heating and energy saving devices disclosed in this application. Further more, a hollow pillar or a hollow frame of building can also be used. The heat transferring fluid can be air (FIG. 1-C), antifreeze, water (FIG. 2 and FIG. 3-C) and other liquids.

Referring to FIG. 1-D, a schematic side view of an exemplary insulating glass style solar heat collector (IG-SHC) and building element 10 is illustrated. Here device 10 is not only a solar heat collector, but also an energy saving building element or unit. 101 is an insulating glass and the like that means a insulating glass, a hollow transparent object or two transparent sheets which is separated and enclosed by spacer. The insulating glass or hollow glass has been used in the recent buildings widely. It also can be other two or triple transparent plates separated by spacers. The spacer may contain drier. Two or three layer glasses and spacer form one or two spaces in which filled by air or other gas for heat insulation. The space (s) also can be evacuated.

Here in FIG. 1-D, there are two layers of glass 102, 103 and spacer 108 to form a closed space 107. A solar heat absorber 104 is arranged in the space 107 and separates 107 into two subspaces 1071 and 1072. The two subspaces can be completely isolated each other or they are connected by air. Air or other gas is filled in the subspaces for heat insulation. A set of smaller supporter (not show in Figure) support and fixes the absorber from two sides. Other fluid including liquid, like water, also can be filled in the subspace to store and transfer heat. For example, when the insulating glass has triple glass panes, a single solar heat absorber (without fluid channel) is arranged in one of two spaces, the second space can fill in fluid to store and transfer heat. In this case the fluid channel is the subspace. In this case, the solar heat absorber also can be the middle glass with a solar heat absorb coating. The absorber 104 has solar heat absorbing coating in one side or two sides. It can be a single solar heat absorber without fluid channel.

Usually a set of fluid channels is arranged at the absorber 104. In FIG. 1-D, there are only two channels 1051 and 1052 of the channels are shown as representatives. One (at center) or two (at two sides) convergent tube(s) connects other liquid tubes and having end(s) extend to outside of 101. The convergent tube has one or two open ends. It depends on the situation of the collector/unit 10. If the unit is at the end of a wall or roof, one open end is enough. If the unit is at the middle of a series of units to pass the fluid, two open ends are required. In FIG. 1-D convergent tube 106 connects the sub-channels like 105 and having two connecting fittings 1091 and 1092 at the frame of the collector. Here 1091 is a liquid outlet and 1092 is a liquid inlet. The liquid can be water, antifreeze or other heat storage and transfer liquids. Some time the angles between sub-channels (1051, 1052) and the convergent tube (106) are non-orthogonal angles. The angle may larger than 95 degree to allow the heated liquid move easier and faster in the sub-channels. The fluid also can be air or other gases.

The solar heat absorber not only can be a single sheet of absorber or a sheet with liquid channels. It also can be a plat shaped container or tank like 208 shown in FIG. 2-B. The material filled in the tank can be any heat storage material such as solid material, fluid material and phase change material. The material is to store heat for transferring. In any case the solar heat absorber in the insulating glass make the building element stronger to against the damage and breaking of the building. Especially when the absorber is a plate shaped tank. So the unit can be used in any flow as a wall or other building element. Furthermore the solar heat absorber lets the two layer insulating glass having two separated air spaces. The heat insulation may be strengthened.

When sunlight shines on the energy saving building element 10, the sunlight pass through glass 102 and reach the surface of solar heat absorber 104. The absorber absorbs the heat and transfers it to the liquid in the liquid channels like 1051 and 1052. Because the space 1071 and 1072 are insulated by air, so most of the absorbed heat is transferred into the liquid. Through convergent tube 106 the heat is transferred to outside of the unit through the fittings 1091 and 1092 for water and/or space heating. In the hot season, to speed up the flow of the liquid in the unit will cool down the unit and building. In the cold season, the heated liquid can stay in the unit to warm the building element, so that the spaces in the building are heated.

Referring to FIG. 2-D, a schematic side view illustrating another insulating glass style solar heat collector and energy saving building element 20. Similar to 10 in FIG. 1-D, 20 of FIG. 2-D has an insulating glass 201 and the like. There are two layers of glass 202, 203 and spacer 208 to form a closed space 207. A solar heat absorber 204 is arranged in the space 207 and separates 207 into two subspaces 2071 and 2072. The absorber 204 has solar heat absorbing coating in one side or two sides. The absorber 204 also can have solar heat absorbing coating in one side and an opposite side is for radiating heat. For example, an absorber made by aluminum alloy. Its one side has solar heat coating. Its other side is polished. When we use this kind of the unit to build roof or wall, at daytime the absorber collects the solar heat at one side and radiate heat at other side to the spaces in the building. At nighttime, the polished side reflects the heat in room to reduce heat loss. A set of fluid channels 2051, 2052 to 2057 and 2058 is arranged and integrated in the absorber 204 One convergent tube 206 is arranged at the right side of insulating glass 201 and out of the space 207 for reducing thickness of the space or reduce the heat loss. It is also easier to put it in the frame of the building. The convergent tube 206 connects the liquid tubes 2051, 2052 to 2057 and 2058. If necessary, heat tubes may replace the fluid channels. Heat tubes are more expensive then fluid channels. But heat tubes have only thermal connecting with convergent tube and without fluid communication between them. A second convergent tube may be arranged at opposite side of the insulating glass, but it is not in this case. The convergent tube 206 may have its own heat insulation. The tube can also be installed in a building frame and insulated in the frame. The convergent tube 206 has an inlet 2091 for cold water and an outlet 2092 for the heated water. In FIG. 1-D and FIG. 2-D, the solar heat absorber 104 and 204 may have no fluid channel arranged and integrated in the absorber. In the case of FIG. 1-D, the solar heat absorb unit has two separated insulation spaces. It is a very good building element in a cold area. In the case of FIG. 2-D, the part out of the glass of the solar heat absorb plate can be connected to a fluid tube or can heat air directly.

The unit 20 also has an air inlet 2094 and an air outlet 2093. Usually 2093 and 2094 are closed by two spare screw bolts or two bar covers. If necessary we can connect unit 20 to an air heating system and draw out the heated air from one or two spaces in the unit 20. So that the insulating glass style solar heat collector is a multi-function unit for generating heated/cold liquid and/or air. The heated air in the unit 20 also can circulated automatically with the outside air. When the unit heats the space, the flow direction of heated air is rise up to outside of the subspace. When the unit coll the space, the flow direction of cold air is revised.

One of the key points of the solar heat collector 20 has some special features. First the solar heat absorber 204 is inserted in slots in the space of the insulating glass 201 and 203. (Does not show slots in FIG. 2-D). The slots are for supporting and fixing the absorber. There is at least one spacer 2081 is removable and for tubes 2051-2058 to pass through. So that the solar heat absorber 204 can be removed for replacing or recycle. The removed absorber can also be coated again. According to present technologies, the operating life of a building and an insulating glass may be much longer than the operating life of a coating of the solar heat absorber. The disclosed special design will make sure the unit 20 can absorb the solar heat at all operating life time of the building. Other operation processing and functions of 20 are similar with 10 that descript before.

The unit 10 and 20 can be installed in a building as many building elements. For example, they can be put on the top of building as a roof. It can be put in anywhere of building as a wall. We can also make the units to pass sunlight partially by using a net absorber. Or the absorbers insert in part of the space of the glass. Then the unit can be used as a window or sky roof. By controlling the fluid flow direction and speed, the unit can help to heat the space or cool the space. The fluid can be gas, liquid or a combination of them. The fluid channel can be the fluid tubes arranged at the absorbers or the space/subspace of the insulating glass. They also can provide absorbed solar heat for storing or other using. Because the glass and metal absorber can be recycled for use in second time, so the collector is a recyclable solar heat collector. As a building element or unit, the collector also collects solar heat. So it is an energy saving building element. A building installed this kind of element not only can use solar energy to heat the building, but also can cool the building.

The units 10 and 20 can be a solar heat collector to be used separately with a heat storage tank. They can heat the water and make hot water. In this case it is a traditional solar heat collector. A set of accessories is required. They are selected from a group of a solar heat storage tank; a supporting element; a sunlight reflector; a heat storage tank having a thermal connection with said collector; a controllable cover to close or open the thermal channel; a solar cooking appliance and a automatic controlling system. They are mentioned in claims.

By using the elements, a building's walls and roof can be constructed very easy. The only two main elements of a roof and wall are said solar heat collector and frame materials. We can manufacture the units and frame materials in a manufacture plant. Then the units and materials can be moved to field for assembling. The frame material made of metal, wood, bamboo or steel and concrete.

Referring to FIG. 3-D, it is a schematic side view of an exemplary building 30 using solar heat collector and building elements for building heating and cooling. The building in FIG. 3-D shows three sides of 30: A is a roof 302. B is a side facing sunlight. C is a vertical section and side view of the building.

The roof A comprises 3021 and 3022. 3022 is a regular insulating glass to form a sky window that provides sunlight for building. The roof 3021 is built by four insulating glass style solar heat collectors that introduced in FIG. 1-D or 2D. 3023 and 3024 are two convergent tubes of the solar heat absorbers. In the absorber, the angle between convergent tube and other tubes integrated in the absorber may be non-orthogonal. It has been introduced in FIG. 1-D. The outlet of 3023 and the inlet of 3024 are connected for fluid pass through. A water tank and/or heat radiator 307 and an automatic controlling system 308 are arranged under the roof 302 in a space 3071. 307 is similar with 215 in FIG. 2-C and 330 in FIG. 3.C. 307 may be one large tank or a set of small tanks.

At B side, 303 and 305 are the insulating glasses or transparent windows. The energy saving covering of windows 3011 and 3012 installed in rooms to absorb or reflect sunlight according to the room temperature. 304 is a insulating glass style solar heat collector that introduced in FIG. 2D. 306 is a solar heat collector integrated heat collecting and storing that introduced in FIG. 2-B. A flat plate box 3061 filled with heat storage material (here is water) to store heat. 3062 is a solar cooking appliance that disclosed in our prior patent application. 3062 has 3 cooking chambers and an enclosed/insulated space to store solar heat. It is thermally connect with 3061. Here we have two large heat storage devices 307 and 306 (3061 plus 3062). 307 is at a higher place. 3062 is at a lower place. It makes the heat drive self-circulation easier to control. 309 is an awning for first floor and a sunlight reflector for 304. The reflector 309 reflects sunlight to the absorber 304 for generating more heat. The sunlight reflector can put anywhere to collect more heat, even in the back of the building. Each of 303, 304, 305 and 306 may include several pieces and installed in building frame.

Side C is a vertical section side view of the building. 301 is a vertical section of the building frame. A fluid tube network is arranged in the frame and is heat insulated. The network is shown by line with arrows in the figure. The arrows show the direction of fluid flow at one operation condition. Each arrow of 309, 3091-3099 also represents a section of tube and a control valve in the circuit. The convergent tubes 3041 and 3061 are located in the frame 301. They are heat insulated. They also connect each other and connect the fluid tube network. In this case, the heat bank of the building comprises the elements 307, 3061, 3062, fluid channels in 3023, 3024, 3041 and the liquid tube network in 301. The walls of side C and its opposite side can also use insulating glass style solar heat collectors. The solar heat absorbers in the collectors can with or without fluid channels. This arrangement is valuable, because the walls of these two sides also can receive sunlight. Especially in the area having heavy snow in the winter, the insulating grass style solar heat collectors can catch snow reflected sunlight. The design and selection depend on the technical and commercial comparison.

The above-mentioned building using solar heat for heating and cooling can operate automatically without a power pump, if our heat driven liquid self-circulating technologies are employed. Our prior patent applications introduced the technologies. The water tank 307 and automatic controlling system 308 can be moved to first floor or a basement (if the building has one). In this case, the heat circulating needs an electric powered pump.

When the sunlight 310 shines on the building 30, there are many operation cases can be controlled manually or automatically. The cases are similar as discussed in the descriptions of FIG. 1C, FIG. 2-C and FIG. 3-C. Here we only discuss two cases.

1. At a hot season: First we turn the coverings 3011, 3012, 3013 and 3014 to reflect the sunlight and reduce the solar energy enter into the building. Second we fully filed the tank 307 and 3061 with cold water. Third we turn on all the valves 309, 3091-3099. Sunlight 310 heats 304, 3061, 3021 and 3062. The heat received by 3062 will stay in the appliance for food cooking. The remained heat after cooking can be used for hot water. The heated water in 3041 and 3061 rises up and go though 3095, 3097, 309 and into 3023 and 3024 to be further heated. The hot water goes though 3091 and stays at the top of 307 for use. The cold water in bottom of 307 passes though 3099, 3092, 3096, 3093 and 3094 to cool the building and 3041 and 3061. To continue this processing, the solar heated water is stored in 307. The building is cooled.

2. At a cold season: first we turn the coverings 3011, 3012, 3013 and 3014 to collect the solar heat and warm the space. Second we reduce the cold water that filed in the tank 307 and 3061. Third we turn on all the valves 309, 3091-3099. Sunlight heats 304, 3061 and 3021. The heated water in 3041 and 3061 rises up and go though 3095, 3097, 309 into 3023 and 3024 to be further heated. The hot water goes though 3091 and heats the water in 3091 quickly. The heated water in bottom of 307 passes though 3099, 3092, 3096, 3093 and 3094 to warm the building. Then the water gives out heat in the tube network and enters into 3041 and 3061 for heating again. The heat received in 3062 is for cooking, hot water or space heating. The extra solar energy also can stay in 307 and 3061 for heating space at nighttime. We also can turn off all the valves and let the heat collectors 3061 and 3041 to use all absorbed heat for space heating. In this case, the solar heated air in 3023 and 3024 on roof can be circulated automatically to heat the air in the space 3071 through the air inlet and air outlet of the collectors. (not show in this Figure, please refer to 2093 and 2094 in FIG. 2-D). The heated air can be pumped to heat building space. To continue this processing, the building is heated by solar heat continuously.

Above are two samples by controlling the contained water in 307 to heat or cool a building automatically without employ any other energy except solar heat. There are lots of operation selections. We can move the tank 307 to first floor or basement (if there is one), to use a pump for water circulating. We can separate the solar heating system into two or three subsystems and operate each system independently. As mentioned in the description of FIG. 2D, the units of roof 3021 are multifunction unit. At wintertime, we can turn off the valves 309 and 3091, to draw the solar heat air out from the roof 3021 and space 3071 for space heating. Each collector of 3021 has air inlet and air outlet connected to a subspace of the collector. They are like 2093 and 2094 in FIG. 2-D, but did not show in FIG. 3-D. The solar heated air in roof 3021 can be pumped directly from the collectors. Or the heated air can circulate automatically to heat the air in the space 3071 for pumping. We can change the valve arrangement to get many different operation cases. We can also use electric power pump, controlling software and hardware to operate the solar heating and cooling system automatically. Many cases have been discussed in the descriptions of FIG. 2-C, 3-C and this Figure. Further more cases can be designed and arranged.

Other modifications will be apparent to those skilled in the art and, therefore, the invention is defined in the claims.

What is claimed is:

1. A building using solar energy for heating and cooling, comprises:
   a building element having a solar heat absorber collecting solar heat;
      a fluid channel arranged in said building element for a fluid to transfer the absorbed solar heat for heating building or to removing heat for cooling building; and
   a mechanism for directing and controlling the flow of said fluid;
   wherein said building element comprising an insulating glass style solar heat collector (IGSHC), comprising:
      an insulating glass means, formed from two transparent sheets and a spacer to form a closed hollow space;
      said solar heat absorber arranged in said hollow space, and separating said hollow space into a first subspace and a second subspace;
      said fluid channel thermally connected with said solar heat absorber for heat transfer, said channel connected to a convergent tube, which is located outside of said hollow space; and an air inlet and an air outlet, arranged at two sides of said first or second space, for drawing heated air out from one of the first subspace and the second subspace, each of the air inlet and air outlet having a respective cover for closing or opening said air channel.

2. The building according to claim 1, further comprises:
said mechanism comprising a first gap from an interior of the building to a lower section of the air channel;
a second gap from an interior of the building to an upper section of the air channel, the second gap being higher than the first gap;
a third gap, from the lower section of the air channel to an exterior of the building;
a fourth gap, from the upper section of the air channel to an exterior of the building, the fourth gap being higher than the third gap; and
said mechanism to transfer the solar heat to interior or exterior of the building and achieve heating or cooling of the building interior;
wherein said fluid is air.

3. The building of claim 2 wherein, said mechanism is selected from a group of:
the mechanism been operable to open the first and second gaps and close the third and fourth gaps for heating the building interior;
the mechanism been operable to close the first and second gaps and open the third and fourth gaps for cooling the building;
the mechanism comprising, for each of the first, second, third and fourth and fifth gaps, a cover for selectively covering or uncovering the respective gap;
wherein said fifth gap is from the interior of the building to said source of cooler air outside of the building.

4. The building according to claim 1, wherein said fluid is a liquid, said channel forms a part of a closed loop for the fluid, a heat storage bank for storing and supplying the solar heat, the heat storage bank including a liquid tank in fluid communication with, and forming part of, the closed loop for fluid, and said mechanism directing and controlling the flow of said fluid in the closed loop, the mechanism including a first valve in the closed loop between the fluid channel and the liquid tank and a second valve in the closed loop on an opposite side of the liquid tank from the first valve, wherein the mechanism is operable to selectively heat or cool the building based on an open/closed state of the first and second valves.

5. The building of claim 1 wherein the mechanism is selected from a group of:
the mechanism is operable to open the first and second valves for circulation of heated fluid from the liquid tank through the closed loop for heating the building;
the mechanism is operable to open the first valve and close the second valve, the cooling resulting from heated fluid moving from the fluid channel into the liquid tank and from cool fluid, cooler than the heated fluid, moving from the liquid tank into the fluid channel and thereby cooling the building element;
the mechanism is operable to control the fluid capacitance, flow speed and temperature in the liquid tank to control the liquid temperature in the close loop for heating or cooling said building wall.

6. The building of claim 1, wherein said fluid channel is selected from a group of:
said first hollow space; said second hollow space; and said fluid channel.

7. The building according to claim 1, is selected from a group of:
a commercial building; an industrial building; an agriculture building; a residential building; an education building; a defense building; and a building having an element able to reach sunlight.

8. The building according to claim 1, wherein said building element is selected from a group of:
wall; roof; pillar; beam; veranda; window; door; deck; awning; fence; path; driveway; brick; tile; floor; covering of windows; covering of doors; solar heat collector as a building element; solar heat storage device as a building element; fully sealed solar heat absorber; a building element with a transparent covering at surface; a building frame; a swimming pool; a solar cooking appliance build in the building; a element having a dark color surface; a element having a solar heat absorbing coating on a surface; a metal covering with a solar heat absorbing coating; a building material covered by a metal covering that having a solar absorbing coating; a solar heat collector without insulation back and used building element as its insulation back; and a combination of two or more above mentioned elements.

9. The building according to claim 1, wherein said fluid channel is selected from a group of:
a liquid channel; a gas channel; a heat tube; a air space in a solar heat collector;
and a combination of two or more above mentioned channels.

10. The building according to claim 1, further comprises a device selected from a group of:
a heat storage device thermally connected to said fluid channel;
a two layer liquid tank having a mechanism controlling liquid quantity in said tank automatically;
a solar heat radiator thermally connecting to said fluid channel;
a control valve;
a sensor;
an automation control system;
an electric power pump;
a heat driven self-circulating device;
a solar cooking appliance;
an energy saving covering for windows and doors;
a solar heat appliance;
a heat pump for using energy from solar heated water in the building and earth energy; and
a combination of two or more above mentioned devices.

11. The building according to claim 1, wherein said heat storage bank is selected from a group of:
a building element with a heat storage capacitance;
a liquid heat storage tank;
a liquid heat storage tank further comprises one or more of electric heater, release valve, drain valve and anode protection;
a liquid heat storage tank having a detachable heat insulation overcoat;
a liquid heat storage tank having a cover able to open to atmosphere;
a double layer liquid heat storage tank;
a liquid reservoir;
a liquid reservoir having a open top;
a heat driven self circulating liquid storage tank, and
a combination of two or more above mention devices.

12. The building according to claim 10, wherein said heat radiator is selected from a group of:

a liquid tank having a detachable heat insulation overcoat for transferring the tank between heat storage and heat radiation;

a liquid reservoir opened to atmosphere and liquidly connected to said fluid channel within said building element;

an airtight fluid container having a port connected to said fluid channel and having a wall thermally connected to ground;

an airtight fluid container having a port liquidly connected to said fluid channel and having a wall thermally connected to a water reservoir, e.g. a swimming pool;

a fluid tube arranged within a wall of said building base; and a fluid tube arranged within a wall of a basement of said building, and fluidly connecting to said fluid channel within said building element.

13. The building according to claim 1, wherein said building element comprises:
a fully airtight sealed and water resistant solar heat absorber, comprising:
a base material of solar heat absorber,
a solar heat absorbing coating on said base material,
a transparent and water resistant protection for absorbing coating, and
a fully airtight sealed and water resistant protection for base material.

14. The building according to claim 1, wherein said building element comprises:
a solar heating device integrated solar heat collecting with heat storing in one unit, comprising:
a solar heat storage container comprising a solar heat absorber on a wall surface;
a solar heat storage and conducting material placing in said container, said solar heat absorber heat said heat storage and conducting material directly;
a fluid channel for transferring heat;
a transparent covering for sunlight pass through, heat insulation and/or protection; and
a heat insulation.

15. The building according to claim 14, wherein said solar heat storage container of said solar heating device is selected from a group consisting of:
a container comprising a flat plate solar heat storage tank, said tank having a solar heat absorb coating on upper wall to collect solar heat and heat the heat storage and conducting material placed in said tank directly, and a fluid inlet fitting and a fluid outlet fitting arranged on the wall of the tank; and
a container comprising a solar heat storage tank, said tank having a outside wall being said solar heat absorber to collect solar heat and heat the heat storage material in the tank directly.

16. The building according to claim 14, wherein said solar heating device is a multifunction solar heating device for solar heated water and/or air, wherein said fluid channel comprises:
a liquid channel and an air inlet fitting and an air outlet fitting for generating solar heated water and/or air.

17. The building according to claim 1, wherein said solar heat absorber, comprising:
an energy saving window blind style solar heat absorber, comprising:
a shade made of base material comprising a group of adjustable slats arranged one next to another, said slats having:
a first side for absorbing solar heat, and
a second side for reflecting heat;
a fluid channel arranged at said shade for transferring heat;
a convergent tube thermally connected with said fluid channel and without fluid communication with said fluid channel, said convergent tube thermally connected with heat storage container; and
a mechanism for controlling orientation of said slats.

18. The building according to claim 17, wherein said energy saving window blind style solar heat absorber, further comprises an element selected from a group consisting of:
a frame with a transparent cover for said absorber arranged therein;
a frame with a transparent cover for said absorber and a heat storage container to arranged therein;
a frame with a transparent cover for said absorber, a heat storage container and a insulation back to arranged therein;
a photovoltaic solar cell to convert solar energy directly into electric and heat energy;
a window integrated said absorber;
a automation control system to optimise sunlight absorbing; and
a combination of two or more above mentioned elements.

19. The building according to claim 1, wherein said element is a solar heating device integrated solar heat collecting with heat storing in one unit, comprises:
a liquid reservoir comprising:
a open top to receive sunlight;
a wall of said reservoir having a solar heat absorb coating, and said wall can become submerged in the liquid;
said liquid placing in said reservoir, said solar heat absorb coating heating said liquid directly; and
a heat insulation insulating said reservoir.

20. The building according to claim 19, wherein said wall of said solar heating device is selected from a group of:
a wall comprising a transparent sheet having one side with solar heat absorbing coat, and the opposite side can become submerged in the liquid;
a wall comprising a sheet having one side with solar heat absorbing coat, and said side can become submerged in the liquid;
a wall comprising a sheet having one side with a solar heat absorb coating, said side having a transparent water resistant protection, and said side can become submerged in the liquid;
a wall comprising a transparent sheet having two sides with solar heat absorb coating, and said one side can become submerged in the liquid;
a wall comprises a fully airtight sealed and water resistant solar heat absorber comprising
a base material of solar heat absorber,
a solar heat absorbing coating on said base material,
a transparent and water resistant protection for absorbing coating, and
a fully airtight sealed and water resistant protection for base material;
a wall of a double layer air inflated liquid reservoir, comprising:
a transparent external layer wall,
an internal layer wall having a solar heat absorbing coating,
a bottom wall able to absorb solar heat,
a heat insulation pad under said bottom wall, and
a double layer air inflated transparent cover.

21. The building according to claim 1, wherein said mechanism directing and controlling the flow of said fluid is selected from a group consisting of:
- a fluid channel having two end facing toward a inter space of said building;
- a fluid channel having two end facing toward atmosphere;
- a fluid channel having one end facing toward a inter space of said building and a opposite end facing toward to atmosphere;
- a pump;
- a valve;
- a tube/conduit;
- a sensor;
- a data indicating and measuring device;
- a automatic control system;
- and a combination of above mentioned two or more mechanisms.

22. A insulating glass style solar heat collector (IGSHC), comprises:
- an insulating glass means, formed from two transparent sheets and a spacer to form a hollow space;
- a removable solar heat absorber removably received in a slot in said hollow space, and separating said space into a first subspace and a second subspace;
- a fluid channel thermally connected with said solar heat absorber for heat transfer;
- a mechanism for directing and controlling the flow of said fluid;
- said solar heat absorber arranged in said hollow space, and separating said hollow space into a first subspace and a second subspace;
- said fluid channel thermally connected with said solar heat absorber for heat transfer, said channel connected to a convergent tube, which is located outside of said hollow space; and
- an air inlet and an air outlet, arranged at two sides of said first or second space, for drawing heated air out from one of the first subspace and the second subspace, each of the air inlet and air outlet having a respective cover for closing or opening said air channel.

23. A building using solar energy for heating and cooling, comprising:
- a insulating glass style solar heat collector (IGSHC), comprises:
  - a insulating glass means, formed from two transparent sheets and a spacer to form a closed hollow space,
  - a removable solar heat absorber removably received in a slot in said hollow space and separating said space into a first subspace and a second subspace;
  - a fluid channel thermally connected with said solar heat absorber for heat transfer;
  - a mechanism for directing and controlling the flow of said fluid; and
  - an air inlet and an air outlet, arranged at two sides of said first or second space, for drawing heated air out from one of the first subspace and the second subspace, each of the air inlet and air outlet having a respective cover for closing or opening said air channel;
  - wherein said solar heat absorber arranged in said hollow space, and separating said hollow space into a first subspace and a second subspace; and
  - wherein said fluid channel thermally connected with said solar heat absorber for heat transfer, said channel connected to a convergent tube, which is located outside of said hollow space.

24. The insulating glass style solar heat collector (IGSHC) according to claim 22, wherein said solar heat absorber is selected from a group of:
- a sheet having a solar heat absorb coating in one side;
- a sheet having solar heat absorb coatings in two side;
- a solar heat absorber having fluid channel arranged;
- a solar heat absorber having a non-orthogonal angle included between liquid channels and a convergent tube;
- a solar heat absorber having one side to absorb solar heat and a opposite side to radiate heat;
- a flat tank having a surface with solar heat absorb coating, a heat storage material placing in said tank;
- a net solar heat absorber for sunlight passing through partially;
- a solar heat absorber that placed in the space partially for insulating glass passing sunlight partially;
- a removable solar heat absorber able to be removed from said insulating glass or the like;
- a absorber having a slot for removing and installing the absorber from and into said insulating glass;
- a recyclable solar heat absorber;
- a solar heat absorber capable for recoating after usage;
- a solar heat absorber having a converging tube being out of insulating glass and said tube having
- a heat insulation;
- a solar heat absorber having a converging tube being out of insulating glass and located in a frame of said building; and
- a combination of two or more above mentioned solar heat absorbers.

25. The insulating glass style solar heat collector (IGSHC) according to claim 22, wherein said fluid channel is selected from a group of:
- said first subspace;
- said second subspace;
- said first and second subspace;
- a heat tube thermally connected with the absorber;
- a heat tube thermally connected with heat storage material in the space;
- a fluid channel arranged at said solar heat absorber;
- a fluid channel arranged at said solar heat absorber, and an air inlet and a air outlet arranged on the spacer for IGSHC generating solar heated liquid and/or air;
- a fluid channel thermally connected with solar heat absorber;
- a fluid channel thermally connected with a subspace;
- a end of solar heat absorber extended out of the space;
- a end of heat storage material in said space extended out of space; and
- a combination of liquid channel and a space channel for both liquid and air to transfer heat at the same or different period of time.

26. The insulating glass style solar heat collector (IGSHC) according to claim 22 wherein said collector forms a solar heating system, said system further comprises one selected from a group of:
- a solar heat storage tank;
- a supporting element;
- a sunlight reflector;
- a heat storage tank having a thermal connection with said collector;
- a controllable cover to close or open the fluid/air channel;
- a solar cooking appliance; and
- a automatic controlling system.

27. The insulating glass style solar heat collector (IGSHC) according to claim 22, wherein said solar heat collector forms a part of a building using solar heat for heating and cooling, said building further comprising one selected from a group of:
- a heat storage device thermally connected said fluid channel;
- a two layer liquid tank having a mechanism controlling liquid quantity in said tank automatically;
- a solar heat radiator thermally connecting to said fluid channel;
- a control valve;
- a sensor;
- an electric power pump;
- a heat driven self-circulating device;
- a solar cooking appliance;
- an energy saving covering for windows and doors;
- a solar heat appliance;
- a heat pump for using energy from solar heated water in the building and earth energy;
- a automation control system;
- a frame wherein the IGSHC is located;
- a hollow frame for a network of fluid tubes and valves arranged wherein and being insulated;
- a hollow aluminum alloy frame, a network of fluid tubes and valves arranged in the hollow space and being insulated; and
- a wooden frame, a network of fluid tubes and valves arranged in said wood and being heat insulated.

28. The building using solar energy for heating and cooling according to claim 23, further comprising a heat bank selected from a group of:
- a building element with a heat storage capacitance;
- a liquid heat storage tank;
- a liquid heat storage tank further comprises one or more of electric heater, release valve, drain valve and anode protection;
- a liquid heat storage tank having a detachable heat insulation overcoat;
- a liquid heat storage tank having a cover able to open to atmosphere;
- a double layer liquid heat storage tank;
- a liquid reservoir;
- a liquid reservoir having a open top;
- a heat driven self circulating liquid storage tank, and
- a combination of two or more above mention devices.

29. The insulating glass style solar heat collector (IGSHC) according to claim 22, wherein said solar heat absorber comprising:
- an energy saving window blind style solar heat absorber, comprising:
  - a shade made of base material comprising a group of adjustable slats arranged one next to another, said slats having:
    - a first side for absorbing solar heat, and
    - a second side for reflecting heat;
  - a fluid channel arranged at said shade for transferring heat;
  - a convergent tube thermally connected with said fluid channel and without fluid communication with said fluid channel, said convergent tube thermally connected with heat storage container; and
  - a mechanism for controlling orientation of said slats.

30. The insulating glass style solar heat collector (IGSHC) according to claim 22, wherein said mechanism is selected from a group of:
- a fluid channel having two end facing toward a inter space of said building;
- a fluid channel having two end facing toward atmosphere;
- a fluid channel having one end facing toward a inter space of said building and a opposite end facing toward to atmosphere;
- a pump;
- a valve;
- a tube/conduit;
- a sensor; a data indicating and measuring device;
- a automatic control system; and
- a combination of above mentioned two or more mechanisms.

31. The building using solar energy for heating and cooling according to claim 23, further comprising
a solar heating device integrated solar heat collecting with heat storing in one unit, comprises:
- a liquid reservoir comprising:
  - a open top to receive sunlight, and
  - a wall of said reservoir having a solar heat absorb coating, and said wall can become submerged in the liquid;
- wherein said liquid is placed in said reservoir, said solar heat absorb coating heats said liquid directly, and a heat insulation insulates said reservoir.

* * * * *